United States Patent [19]

Finch et al.

[11] Patent Number: 4,783,778
[45] Date of Patent: Nov. 8, 1988

[54] SYNCHRONOUS PACKET MANAGER

[75] Inventors: William W. Finch, Lisle, Ill.; Gulay Sencer, Red Bank, N.J.

[73] Assignee: GTE Communication Systems Corporation, Phoenix, Ariz.

[21] Appl. No.: 908,112

[22] Filed: Sep. 16, 1986

[51] Int. Cl.⁴ .............................................. H04L 5/00
[52] U.S. Cl. ....................................... 370/60; 370/94
[58] Field of Search ................... 375/121, 17, 49, 117; 370/94, 88, 119, 60

[56] References Cited

U.S. PATENT DOCUMENTS

| | | | |
|---|---|---|---|
| 4,578,789 | 3/1986 | Middleton et al. | 370/67 |
| 4,584,690 | 4/1986 | Cafiero et al. | 375/18 |
| 4,637,035 | 1/1987 | Betts | 375/12 |

OTHER PUBLICATIONS

"8274 Multi-Protocol Serial Controller (MPSC)", Intel Corp., 1980, pp. 1-35.

Primary Examiner—Douglas W. Olms
Assistant Examiner—Melvin Marcelo
Attorney, Agent, or Firm—Gregory G. Hendricks

[57] ABSTRACT

The Synchronous Packet Manager is the interface for switching synchronous data between a data terminal equipment and a combination data and telephone switching system in a proprietary packet format. A first microprocessor controlled circuit controls data to be received from the switching system or forwarded to it and communicates with a second microprocessor controlled circuit for controlling data to or from a terminal equipment via a common memory.

1 Claim, 24 Drawing Sheets

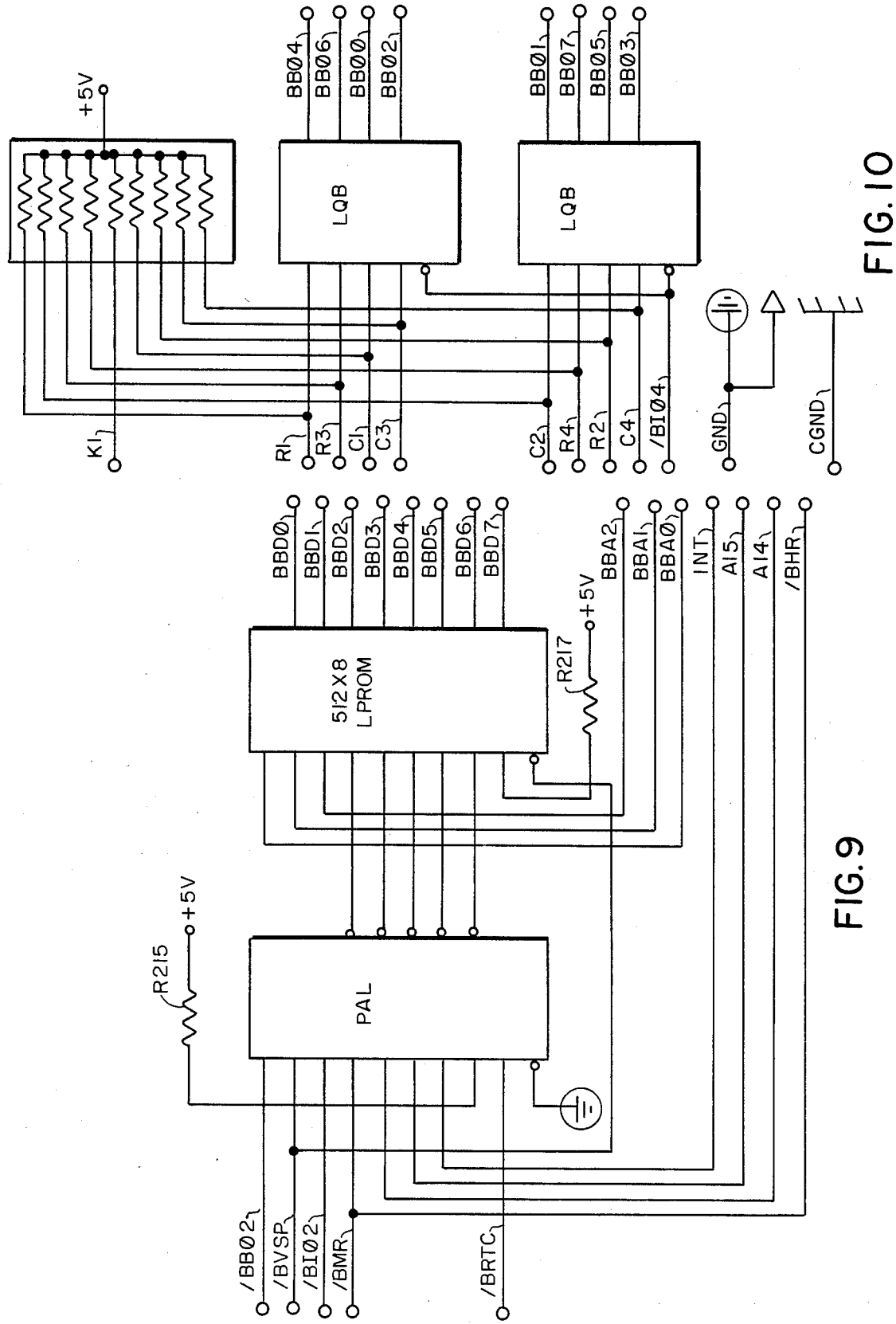

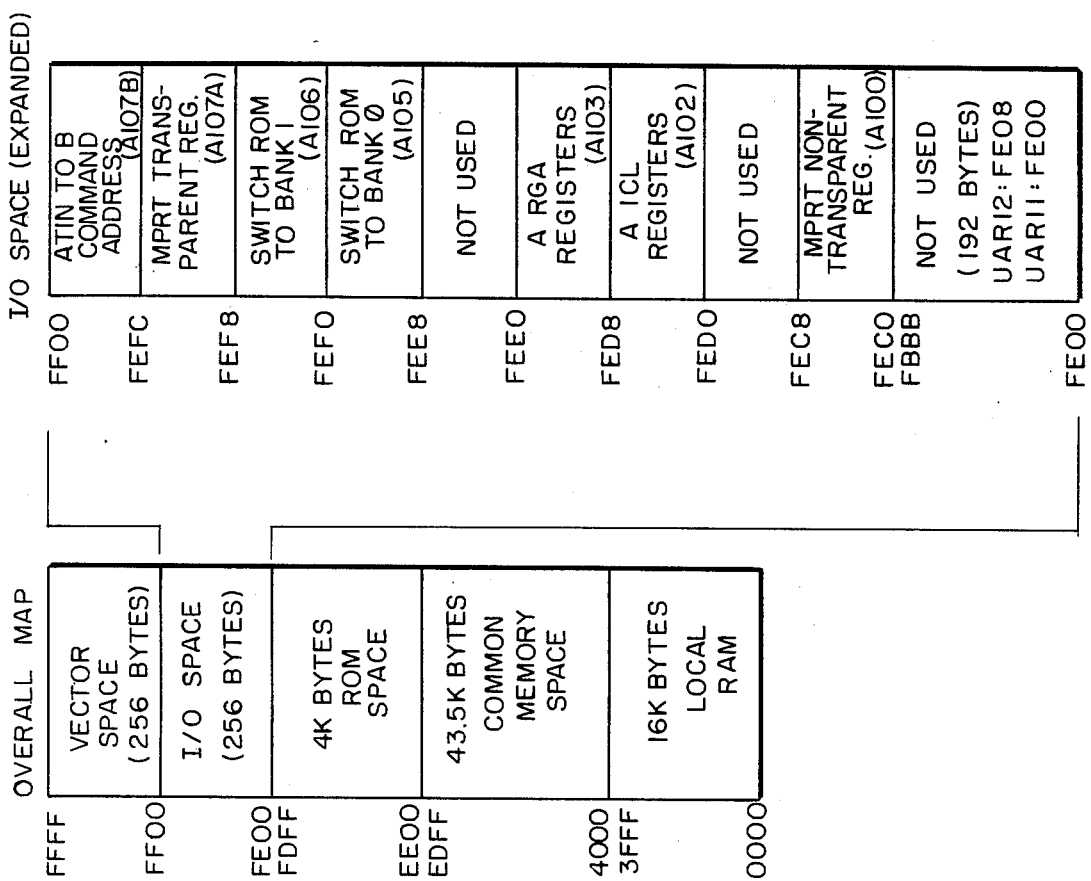
FIG. 23
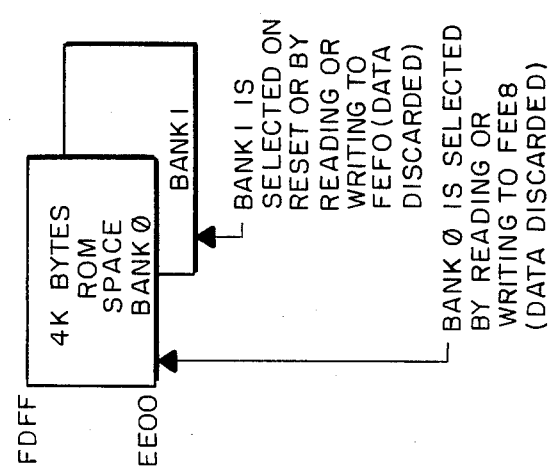
FIG. 21
FIG. 22
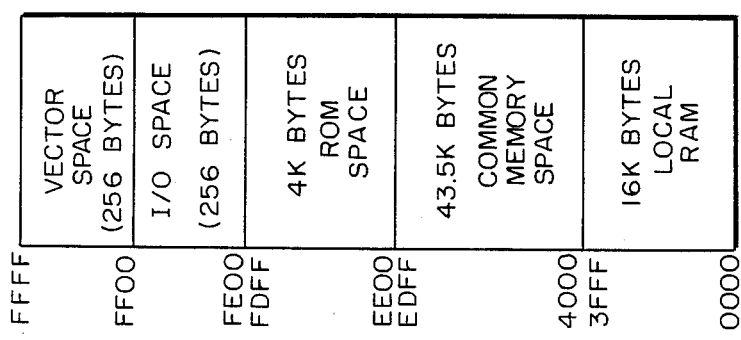
FIG. 19
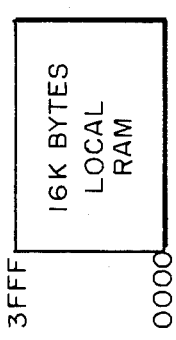
FIG. 20

FIG. 25

| | B7 | B6 | B5 | B4 | B3 | B2 | B1 | B0 |
|---|---|---|---|---|---|---|---|---|
| 7: W- | | | DATA DISCARDED (ICL ENABLE INTERRUPTS REGISTER, WRITE) | | | | | |
| 6: R/W | X | X | VA5 | VA4 | VA3 | VA2 | VA1 | VA0 |
| | | | VECTOR DATA (POINTER) (ICL VECTOR READ/WRITE REGISTER) | | | | | |
| | | | (ICL POINTER REGISTER, READ/WRITE) | | | | | |
| 4: W- | | | DATA DISCARDED (ICL INTERRUPT DISABLE REGISTER, WRITE) | | | | | |
| 3: | EN V17 | EN V16 | EN V15 | EN V14 | EN V13 | EN V12 | EN V11 | EN V10 |
| | | | (ICL INTERRUPT ENABLE REGISTER, READ/WRITE) | | | | | |
| 2: | E/L V17 | E/L V16 | E/L V15 | E/L V14 | E/L V13 | E/L V12 | E/L V11 | E/L V10 |
| | | | (ICL EDGE LEVEL REGISTER, READ/WRITE) | | | | | |
| 1: | MSK V17 | MSK V16 | MSK V15 | MSK V14 | MSK V13 | MSK V12 | MSK V11 | MSK V10 |
| | | | (ICL INTERRUPT MASK REGISTER, READ/WRITE) | | | | | |
| R- 0: | IIS | CL2 | CLI | CL0 | I | I | AN | ME |
| | | | (ICL STATUS REGISTER, READ) | | | | | |
| W- | | | | SW RESET | | SW R11 | AN | ME |

LOCATION: FED0-FED7

FIG. 24

| | B7 | B6 | B5 | B4 | B3 | B2 | B1 | B0 |
|---|---|---|---|---|---|---|---|---|
| 1: | | | 6 BYTES NOT USED | | | | | |
| 2: W- | SA INI EN | DATA ONLY MODE | SW RESET | BAUD RATE SELA | BAUD RATE SELB | MSTR/ SLV | FULL/ HALF | 12/10 BYTE MODE |
| 1: R- | LAST BYTE | I/O REG FULL | RX OVERRUN ERR | NTMPA | NTSA | BIT ERR | SYNC ERR | NTSA INT ENB |
| 0: | D7 | D6 | D5 | D4 | D3 | D2 | D1 | D0 |
| | | | (MPRT NON-TRANSPARENT DATA REG., R/W) | | | | | |

LOCATION: FEC0-FEC7

FIG. 26 — LOCATION: FED8-FEDF

| | B7 | B6 | B5 | B4 | B3 | B2 | B1 | B0 |
|---|---|---|---|---|---|---|---|---|
| F: | BPE (RF3) | ATTN FROM B (RF2) | BWTDO (RF1) | BRST (RF0) | STOP B (SF3) | START B (SF2) | — (SF1) | — (SF0) |
| B: | A RGA REGISTER 2 | | | | | | | |
| R-A: | x | x | x | x | STOP B (SF3) | START B (SF2) | — (SF1) | — (SF0) |
| W: | x | — | RSTSW (SW1) | x | SLSLED (LED1) | — (LED2) | LDLB (LPBR2) | — (LPBR1) |
| | A RGA REGISTER 1 | | | | | | | |
| R-9: | x | x | x | x | SLSLED (LED1) | — (LED2) | LDLB (LPBR2) | — (LPBR1) |
| W: | | | | | | | | |
| | A RGA REGISTER 0 | | | | | | | |
| R-8: | APB (P9) | (DCE/DTE) | PO | AWDIO | CONF 3 | CONF 2 | CONF 1 | CONF 0 |
| W: | x | x | x | x | — | — | — | 0 (WRITING THIS PATTERN STARTS OR RESETS A'S WATCHDOG TIMER) |

FIG. 27 — LOCATION: FEE8-FEEF

| B7 | B6 | B5 | B4 | B3 | B2 | B1 | B0 |
|---|---|---|---|---|---|---|---|
| 7 BYTES NOT USED | | | | | | | |

READING OR WRITING ANY DATA IN THIS PATTERN TO THIS ADDRESS ENABLES THE BANK 0 OF ANY ROM (DATA IS DISCARDED). BANK 0 IS THE LOWER 4K.

FIG. 28 — LOCATION: FEF0-FEF7

| B7 | B6 | B5 | B4 | B3 | B2 | B1 | B0 |
|---|---|---|---|---|---|---|---|
| 7 BYTES NOT USED | | | | | | | |

READING OR WRITING ANY DATA PATTERN TO THIS ADDRESS ENABLES BANK I OF THE ROM (DATA IS DISCARDED). BANK I IS THE UPPER 4K.

FIG. 29 — LOCATION: FEF8-FEFF

| | B7 | B6 | B5 | B4 | B3 | B2 | B1 | B0 |
|---|---|---|---|---|---|---|---|---|
| | 6 BYTES NOT USED | | | | | | | |
| R-A: | TSA INT EN | I/O REG FULL | x | x | x | x | x | TEST BIT (0) |
| W-9: | LAST BYTE | 0 | 0 | TMPA | TSA | 0 | 0 | TSA INT ENB |
| R-8: | D7 | D6 | D5 | D4 | D3 | D2 | D1 | D0 |

(MPRT TRANSPARENT DATA REGISTER, READ/WRITE)

FIG. 34

I/O SPACE (EXPANDED)

| Address | Contents |
|---|---|
| FF00 | ATTN TO A COMMAND ADDRESS (BIO7) |
| FEF0 | NOT USED (BIO6) |
| FEF0 | NOT USED (BIO5) |
| FEF8 | KEYPAD INPUT REGISTER (BIO4) |
| FEE0 | B RGA REGISTERS (BIO3) |
| FED8 | B ICL REGISTERS (BIO2) |
| FED0 | 6840 PTN REGS. (BIO1) |
| FEC8 | 8274 MPSC REGS. (BIO0) |
| FEC0–FEEF | NOT USED (192 BYTES) |
| FE00 | |

FIG. 30

| Address | Contents |
|---|---|
| FFFF–FFFA | NMI, RESET, BREAK VECTORS |
| FFF9–FF00 | NOT USED |

FIG. 31

| Address | Contents |
|---|---|
| FFFF–FF00 | VECTOR SPACE (256 BYTES) |
| FE00–FDFF | I/O SPACE (256 BYTES) |
| | 4K BYTES LOCAL RAM (PART OF DRAM ARRAY, W/ARB. & REF.) |
| EE00–EDFF | 43.5K BYTES COMMON MEMORY SPACE |
| 4000–3FFF | |
| 0000 | 16K BYTES LOCAL RAM (PART OF DRAM ARRAY, W/ARB. & REF.) |

FIG. 32

| Address | Contents |
|---|---|
| EDFF–4000 | 43.5K BYTES COMMON MEMORY SPACE |

FIG. 33

| Address | Contents |
|---|---|
| 3FFF–0000 | 16K BYTES LOCAL RAM ACCESSIBLE ONLY BY 'B' PROCESSOR |
| FDFF–EE00 | 4K BYTES LOCAL RAM ACCESSIBLE ONLY BY 'B' PROCESSOR |

OVERALL MAP

| Address | Contents |
|---|---|
| FFFF–FF00 | VECTOR SPACE (256 BYTES) |
| FE00–FDFF | I/O SPACE (256 BYTES) |
| | 4K BYTES LOCAL RAM (PART OF DRAM ARRAY, W/ARB. & REF.) |
| EE00–EDFF | 43.5K BYTES COMMON MEMORY SPACE |
| 4000–3FFF | |
| 0000 | 16K BYTES LOCAL RAM (PART OF DRAM ARRAY, W/ARB. & REF.) |

|   | B7 | B6 | B5 | B4 | B3 | B2 | B1 | B0 |
|---|---|---|---|---|---|---|---|---|
| F: | WRITE: TIMER 3 LSB LATCH ← B7-B0<br>TIMER 3 MSB LATCH ← MSB BUFFER<br>READ: B7-B0 ← LSB BUFFER REGISTER ||||||||
| E: | WRITE: MSB BUFFER REGISTER ← B7-B0<br>READ: B7-B0 ← TIMER 3 MSB COUNTER<br>LSB BUFFER REG. ← TMR 3 LSB CNTR. ||||||||
| D: | WRITE: TIMER 2 LSB LATCH ← B7-B0<br>TIMER 2 MSB LATCH ← MSB BUFFER<br>READ: B7-B0 ← LSB BUFFER LATCH ||||||||
| C: | WRITE: MSB BUFFER REGISTER ← B7-B0<br>READ: B7-B0 ← TIMER 2 MSB COUNTER<br>LSB BUFFER REG. ← TMR 2 LSB CNTR. ||||||||
| B: | WRITE: TIMER 1 LSB LATCH ← B7-B0<br>TIMER 1 MSB LATCH ← MSB BUFFER<br>READ: B7-B0 ← LSB BUFFER LATCH ||||||||
| A: | WRITE: MSB BUFFER REGISTER ← B7-B0<br>READ: B7-B0 ← TIMER 1 MSB COUNTER<br>LSB BUFFER REG. ← TMR 1 LSB CNTR. ||||||||
| 9: | WRITE: CR27-CR20 ← B7-B0<br>READ: E7-E0 ← STATUS REGISTER ||||||||
| 8: | WRITE: IF CR20=1, CR17-CR10 ← B7-B0<br>IF CR20=0, CR37-CR30 ← B7-B0<br>READ: NO OPERATOR ||||||||

LOCATION: FE08-FE0F

FIG. 36

|   | B7 | B6 | B5 | B4 | B3 | B2 | B1 | B0 |
|---|---|---|---|---|---|---|---|---|
| 7:<br>4: | 4 BYTES NOT USED ||||||||
| 3: | READ: CHANNEL B STATUS READ<br>WRITE: CHANNEL B COMMAND/PARAMETER WRITE ||||||||
| 2: | READ: CHANNEL A STATUS READ<br>WRITE: CHANNEL A COMMAND/PARAMETER WRITE ||||||||
| 1: | READ/WRITE: CHANNEL B DATA READ/WRITE ||||||||
| 0: | READ/WRITE: CHANNEL A DATA READ/WRITE ||||||||

LOCATION: FE00-FE07

LOCATION: FED0-FED7

| | B7 | B6 | B5 | B4 | B3 | B2 | B1 | B0 | |
|---|---|---|---|---|---|---|---|---|---|
| 7: W | DATA DISCARDED | | | | | | | | (ICL ENABLE INTERRUPTS REGISTER, WRITE) |
| 6: R/W | | | VA5 | VA4 | VA3 | VA2 | VA1 | VA0 | VECTOR DATA (POINTER) (ICL VECTOR READ/WRITE REGISTER) |
| 5: R/W | x | x | VA5 | VA4 | VA3 | VA2 | VA1 | VA0 | (ICL POINTER REGISTER, READ/WRITE) |
| 4: W | DATA DISCARDED | | | | | | | | (ICL INTERRUPT DISABLE REGISTER, WRITE) |
| 3: R/W | EN V17 | EN V16 | EN V15 | EN V14 | EN V13 | EN V12 | EN V11 | EN V10 | (ICL INTERRUPT ENABLE REGISTER, READ/WRITE) |
| 2: R/W | E/L V17 | E/L V16 | E/L V15 | E/L V14 | E/L V13 | E/L V12 | E/L V11 | E/L V10 | (ICL EDGE/LEVEL REGISTER, READ/WRITE) |
| 1: R/W | MSK V17 | MSK V16 | MSK V15 | MSK V14 | MSK V13 | MSK V12 | MSK V11 | MSK V10 | (ICL INTERRUPT MASK REGISTER, READ/WRITE) |
| 0: R | I15 | CL2 | CL1 | CL0 | — | — | AN | ME | (ICL STATUS REGISTER, READ) |
| 0: W | — | — | — | SW RESET | — | SW K11 | AN | ME | |

FIG. 38

LOCATION: FED8-FEDE

| | B7 | B6 | B5 | B4 | B3 | B2 | B1 | B0 | |
|---|---|---|---|---|---|---|---|---|---|
| F: | | | | 5 BYTES NOT USED | | | | | |
| B: | RF3 | RF2 | RF1 | RF0 | SF3 | SF2 | SF1 | SF0 | |
| A: R | | | | | | | | | (B RGA REGISTER 2) |
| W: | x | x | x | x | SF3 | SF2 | SF1 | SF0 | |
| 9: R | — | — | KEY-PAD (SW1) | RF4 (SW2) | SF4 (LED 1) | XLSLED (LED 2) | XTMLED (LPBK 2) | DSLB (LPBK 1) | (B RGA REGISTER 1) |
| W: | x | x | x | x | SF4 (LED 1) | XLSLED (LED 2) | XTMLED (LPBK 2) | DSLB (LPBK 1) | |
| 8: R | BPR (PE) | DTE/DCE | RESET FROM A (P0) | BWDT0 (WDT10) | OPI2 (CONF 3) | RS232/V35 (C2) | OPI1 (CONF 1) | OPI0 (CONF 0) | (B RGA REGISTER 0) |
| W: | x | x | x | x | — | 0 | 0 | 0 | (WRITING THIS PATTERN STARTS B'S WATCHDOG TIMER) |

FIG. 39

LOCATION: FEEC-FEEF

| | B7 | B6 | B5 | B4 | B3 | B2 | B1 | B0 | |
|---|---|---|---|---|---|---|---|---|---|
| F: | | | | 7 BYTES NOT USED | | | | | |
| D: | | | | | | | | | WRITING ANY PATTERN TO THIS ADDRESS CAUSES |
| C: | | | | | | | | | AN ATTENTION INTERRUPT TO THE 'A' PROCESSOR |

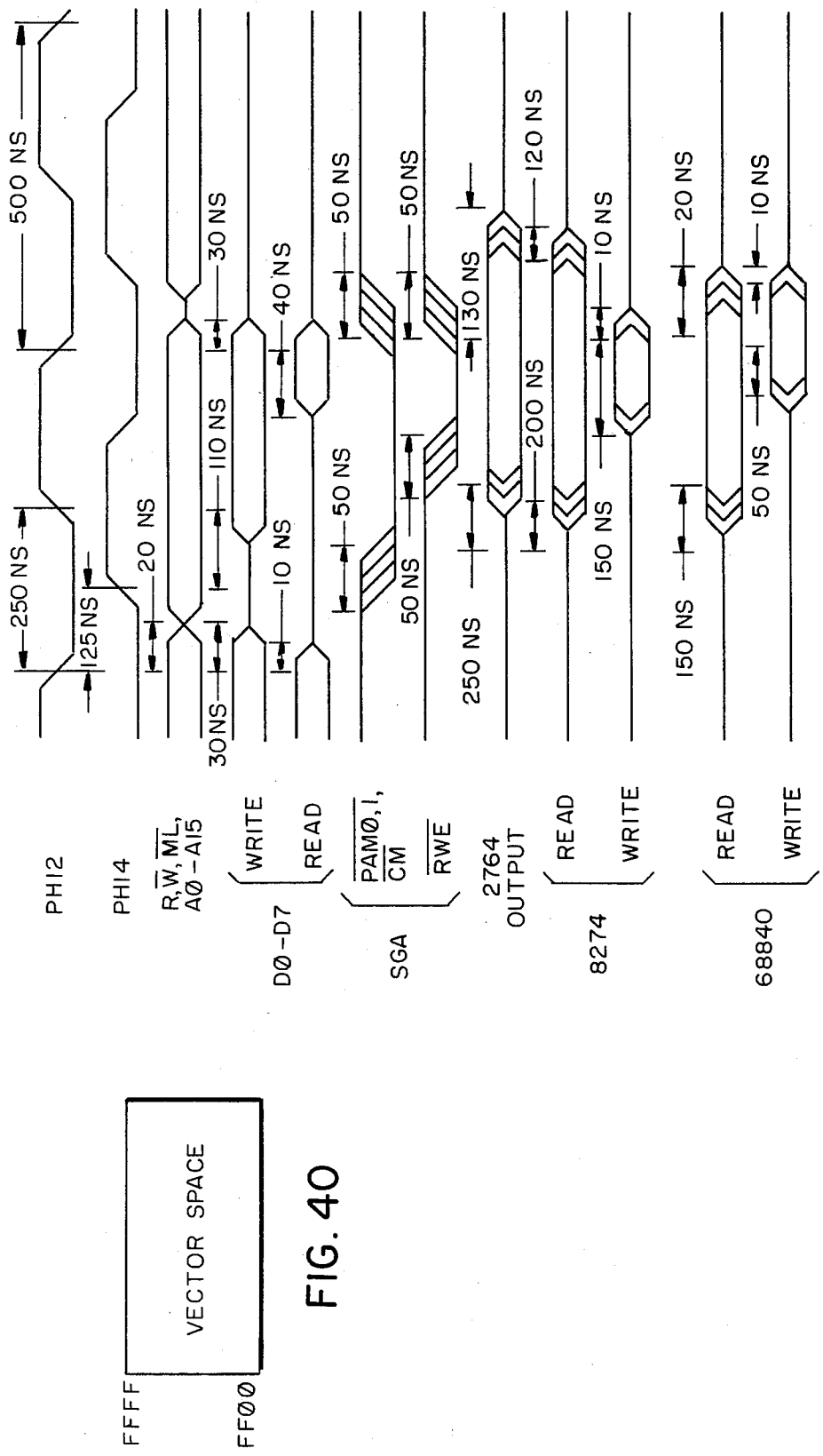

SYNCHRONOUS PACKET MANAGER

CROSS REFERENCE TO RELATED APPLICATIONS

The following applications filed on even date herewith and assigned to the same assignee disclose aspects pertinent to the present application and are hereby incorporated as if fully disclosed herein:

Mini Packet Receiver Transmitter application Ser. No. 908,056 in the name of Holger Opderbeck, Gulay Sencer, William Carr and Steven Byars;

Packet Bus Interface application Ser. No. 908,055 in the name of Steven Byars and William Carr;

Asynchronous Packet Manager application Ser. No. 908,111 in the name of William Finch and Gulay Sencer; and Voice Packet Assembler Disassembler application Ser. No. 908,076 in the name of Gary Schlecte and John Csapo.

BACKGROUND OF THE INVENTION

1. Field of the Invention:

The present invention pertains to a synchronous formatter and more particularly to a synchronous formatter which can convert packets in CCITT X.25 format into a proprietary format adopted to PCM switching.

2. Background of the Invention:

Currently intelligent data networks are based on a transmission technique known as packet switching. These data networks employ special purpose communication switching minicomputers, typically interconnected with leased lines to carry user data from the user source location to its destination.

In general the data messages from users of the network are accepted by the network minicomputers, which assemble them into fixed length segments called packets. The packets are then transmitted through the network in a store and forward fashion to their destination. Each packet is individually handed forward along the best available path and is error checked each time another link is traversed. Complete messages are then reassembled from their constituent packets at the minicomputer which interfaces with the destination user site.

Since many of these intelligent data networks are offered by common carriers a standardized software dependent interface must be employed. The software interface offered on most of these public networks is that defined by the CCITT (Consultative Committee for International Telephone and Telegraph) and known as the X.25 interface. The X.25 defines the procedures for the packet assembly and disassembly between the terminal and the packet switching network. The procedures for this handling of these packets within the switching network are called the network level protocol. This intra network protocol is not CCITT standard and is usually different on each network. Packet formats in the X.25 protocol involve the formats of data and control packets, in general the formats of X.25 packets all contain four(4) basic fields:

General Format Indicator
Logical Channel Identification Number
Packet Type Identifier
Information Field General Format Indicator. The first header field is the general format indicator. The primary purpose of the general format indicator is to specify the format of the modulo number (modulus) being used for this packet. Logical Channel Identification Number. Every control and data packet must contain a two-part logical channel identification number. It consists of a logical channel group number in four bits of the first byte of the packet header, and an eight-bit logical channel number that takes up the entire second byte of the packet header. The logical channel numbers constitute a numbering scheme that is local to the user machine and its network interface. The two users involved in a virtual call or a permanent virtual circuit will probable use different logical channel numbers for their connection with their local Data Circuit Equipments (DCEs). In the initial setup procedure for a virtual call, the network makes an association between the real addresses of the user machines and their logical channel numbers. Then, during the progress of the call, the network itself has to add additional addressing information to the logical channel identification numbers carried in the packets in order to identify the user machines. The addition of this addressing information is left to the network implementor and does not concern the user of the user/network interface.

Packet Identifier. The third byte of a packet header is known as the Packet Type Identifier. The Packet Type Identifier describes the function of the packet being transmitted. The packet information field following the packet identifier will provide additional packet header information depending upon the function of a control packet or it will contain the user data if it is a data packet.

Call request packets. The call request packet normally contains the network address of the destination device and may contain the address of the originating device. Both addresses are variable in length so that long addresses could be used if necessary. These addresses are located in the first bytes of the information field of the Call Request packet. Each digit of the address is encoded in a half-byte of the address field. The address field is preceded by two half-bytes that state how many digits are in each address. The addresses may be followed by a facilities field, which is also of variable length. This field is present when the originating machine wants to make a call with some optional characteristics that must be communicated to the destination machine. Recommendation X.25 specifies several such options. A calling party might indicate that the called party is to pay for the call. A maximum data length might be requested because of limited buffer size. A specific flow control might be requested. The CCITT permits all of these options and allows for other optional facilities that might be added in the future.

For each optional facility requested, the facilities field contains two bytes. The first byte indicates the type of facility requested. The second byte contains a parameter associated with the request: for example, maximum data length.

The Incoming Call packet that travels from the second data circuit terminating equipment to the called data terminating equipment has the same format as the Call Request packet and carries most of the same information. The called data circuit terminating equipment, however, must select its own logical channel numbers, so the logical channel group number and the logical channel number will be different in the Incoming Call packet and the Call Request packet.

To complete the virtual call connection, the called data terminating equipment sends a Call Accepted packet to its data circuit terminating equipment, which is forwarded to the calling data terminating equipment in the form of a Call Connected packet. The Call Accepted/Call connected packet has a relatively simple format, since the optional facilities have already been decided on and the network addresses were carried in the Call Request/Incoming call packet. All the information it needs to carry is contained in the three-byte header.

Before the calling party initiates the virtual call, the logical channel is in a ready state. After the Call Request packet has been passed from the data terminating equipment to its data circuit terminating equipment, the logical channel is in the data terminating equipment waiting state. When the called data circuit terminating equipment passes the incoming Call packet to the called data terminating equipment, the logical channel is placed in the data circuit terminating equipment waiting state. When the called data terminating equipment returns the Call Accepted/Call Connected packet, the logical channel is placed in the data transfer state, and normal data transmission can begin. The virtual call has been set up.

Data Packets. When set data packet is indicated, the bits of byte 3 are broken into three (3) subfields:
(1) A packet receive sequence number (R)
(2) A more-data bit
(3) A packet send sequence number (S)

The functions of the packet receive sequence number and send sequence number are similar to the sequencing performed at the frame level in HDLC. The packet sequence numbers though are independent and will have different values from the link layer numbers.

Data packets for each virtual call are sequenced at packet level. Each data packet contains a Packet Send Count P(S), which will advance with succeeding data packets, and a Packet Receive Count P(R), which will indicate the next expected data packet.

Note that the seuqence numbering N(S) and N(R) at the frame level is used to sequence and authorize all frames at the link level. The sequence numbering P(S) and P(R) at packet level is used to sequence and authorize data packets for a virtual call in the packet network.

The M bit of the third byte of a data packet header is called the More-data bit. When this bit is set to 1, it indicates that more of the same user data record follows in the next sequential packet. The More-data bit can only be set in a packet that contains the maximum allowable number of data bits. Although the CCITT recommends that the maximum data field length be 128 bytes, it does state that some telecommunications administrations may support other maximum data lengths: 16, 32, 64, 256, 512, or 1,024 bytes, or, exceptionally 255 bytes. In this case, data packets may have to be split or combined as they pass from one network to another. The More-data bit would be used to faciliate this splitting and recombination. In this discussion of the third byte packet, we have dealt exclusively with transmission using modulo 8 counts. As we said earlier however, the CCITT allows the use of modulo 128 counts. When the general format identifier indicates that modulo 128 counts are being used for a data packet, three bits are not enough to specify either a send sequence number or a receive sequence number. In these cases, a fourth byte in the header is used to extend each of the sequence number fields by four bits.

Most current networks are being implemented with modulo 8 numbering. However, modulo 128 numbering will probably be employed when satelite links are used and when traffic volumes build up.

For data transfer during a typical data transmission over a permanent or temporary virtual circuit, three (3) types of packets may be used:
(1) Data Packets
(2) Receive Ready packets
(3) Receive Not Ready packets The logical channel remains in the "data transfer" state throughout the data transmission.

Once a virtual circuit has been established, users can transmit data back and forth in Data Packets.

If both user machines on a virtual circuit are sending data, the receipt of data packets can be acknowledged by piggybacking the receive sequence numbers on returning data packets. If only one machine is transmitting data however, the receipt of data packets must be acknowledged by special control packets.

A Receive Ready control packet is used to indicate willingness to receive a given number of packets and to acknowledge the correct receipt of data packets already transmitted. The Receive Ready packet carries a three-bit receive sequence number in the third byte of its packet header. These packets carry no send sequence numbers and no information field.

If a user machine is temporarily unwilling or unable to receive further data packets, it returns a Receive Not Ready packet to the other user machine Like the Receiver ready packet, this packet carries a receive sequence number but no send sequence number. A Receive Not Ready packet acknowledges the correct receipt of data packet, and causes the other user machine to temporarily suspend its data transmission. When a user machine is once again ready to receive data, it sends a Receive Ready packet to the other user machine, and the data transmission is resumed.

Virtual Call Disconnect. A virtual call may be disconnected at the request of either user, or, in special cases, at the request of the network. Three (3) different packet types and four (4) different logical channel states may be involved in this termination process. These packet types and channel states are listed below Packet Types
Clear Request
Clear Indication
Clear Confirmation
Logical Channel States
Data Transfer
Ready
DTE Clear Request
DCE Clear Indication When a user decides to disconnect a virtual call, it sends a Clear Request packet ot its DCE. This packet has a small information field that explains the reason for disconnecting the virtual call. The logical channel is then in the data terminating equipment (DTE) clear request state. The Data circuit equipment responds when it is ready to clear the channel with a Clear Confirmation packet. The Clear Confirmation packet is a simple control packet with no information field. The logical channels is now in the ready state.

The data circuit equipment then transmits the Clear Request to the data circuit equipment at the other end of the logical link. That data circuit equipment sends a Clear Indication packet to the user machine in question. The Clear Indication packet has the same format as the Clear Request packet. The transmission of the Clear Indication packet to a data terminating equipment places the logical channel in a data circuit clear indication state. The user machine responds with a Clear Confirmation packet. The cleared logical channel is then back in the ready state. Normally, it is the user machine that initiates the clearing of a call. When there are network problems, however, the network equipment may need to initiate the clearing. In these cases, the data circuit equipment clears the call by sending a Clear Indication packet to the user machine. The user responds with a Clear Confirmation packet, and the call is disconnected.

SUMMARY OF THE INVENTION

The Synchronous Packet Manager. SPM provides a V24 or V35 interface for switching synchronous data between an X.25 Data Terminal Equipment (DTE) or a Data Circuit Equipment (DCE) and the OMNI switch via a twisted wire pair known as the Local Wire Link (LWL). Connecting the SPM to the OMNI switch will automatically cause the device to be forced into service i. e. operating software required for data manipulation is downloaded to the SPM RAM. The Link LED will be lit indicating that the download operation is completed and the SPM is in service.

The Data Terminal Equipment establishes a call through the SPM via the OMNI switch to the Public Data Network. The SPM call LED will light up indicating that a call is established and the unit is ready for data transfer DTE to PDN and from PDN to DTE.

In establishing a call data is transferred from the Data Terminal Equipment via the V24 or V35 interface TXD signal along with the appropriate control signals. These signals are received on the SPM by the 1489 or 75107 receiver depending on which physical interface is used and converted to the incoming signal levels for transfer to the Multi-Protocol Serial Controller 8274 device.

The 8274 MPSC accepts the X.25 protocol information from the Data Terminal Equipment and transfers it to the common memory under the control of the "B" microprocessor.

The A and B microprocessors communicate with each other via a block of RAM called Common Memory. Since the LWL, is controlled by the "A" microprocessor and the MPSC is controlled by the "B" microprocessor, data transfer from the "B" side to the "A" side and vise versa is accomplished by storing the data first in Common Memory by the "B" microprocessor and then retrieved from the memory by the "A" microprocessor.

Data is moved from the "B" microprocessor to common memory to allow the "A" microprocessor to retrieve the information received by the 8274 and stored in common memory.

The "A" microprocessor retrieves the data from the common memory and under the program controller transfers this data to the Mini-Packet Receiver Transmitter. The MPRT device takes the data on the 8 bit parallel bus and converts it to an Alternate Mark Inversion AMI pattern for transmission to the line driver 713 B device which then transmits the AMI bipolar signals over the local wire loop, the twisted wire pair to the OMNI switch performs the conversion back to the public packet format and transfers the data to the appropriate destination such as a public data network via another SPM.

BRIEF DESCRIPTION OF THE DRAWINGS

An example embodiment is described with reference to the accompanying drawings in which:

FIGS. 2–18 when connected together as indicated comprise a circuit schematic of the synchronous packet manager.

FIGS. 19–40 disclose the memory maps for the various functions of the apparatus.

FIG. 41 is a timing chart showing the relations of some of the operations.

DESCRIPTION OF AN EXAMPLE EMBODIMENT

The Single Line Data Synchronous packet Manager (SPM) provides the interface for switching synchronous data between an X.25 Data Terminal Equipment (DTE) Data Circuit Equipment (DCE) and the OMNI Data System via a twisted wire pair, referred to as the Local Wire Link (LWL).

The SPM communicates with the DTE using HDLC framed X.25 packets and operates at 19.2 kbps. The physical interface is via an RS232c connector, using LAPB link control format. It communicates with the OMNI S111/Data Switch by converting the RS232 compatible signals to Mini-Packet Protocol (MPP).

Figure 1:
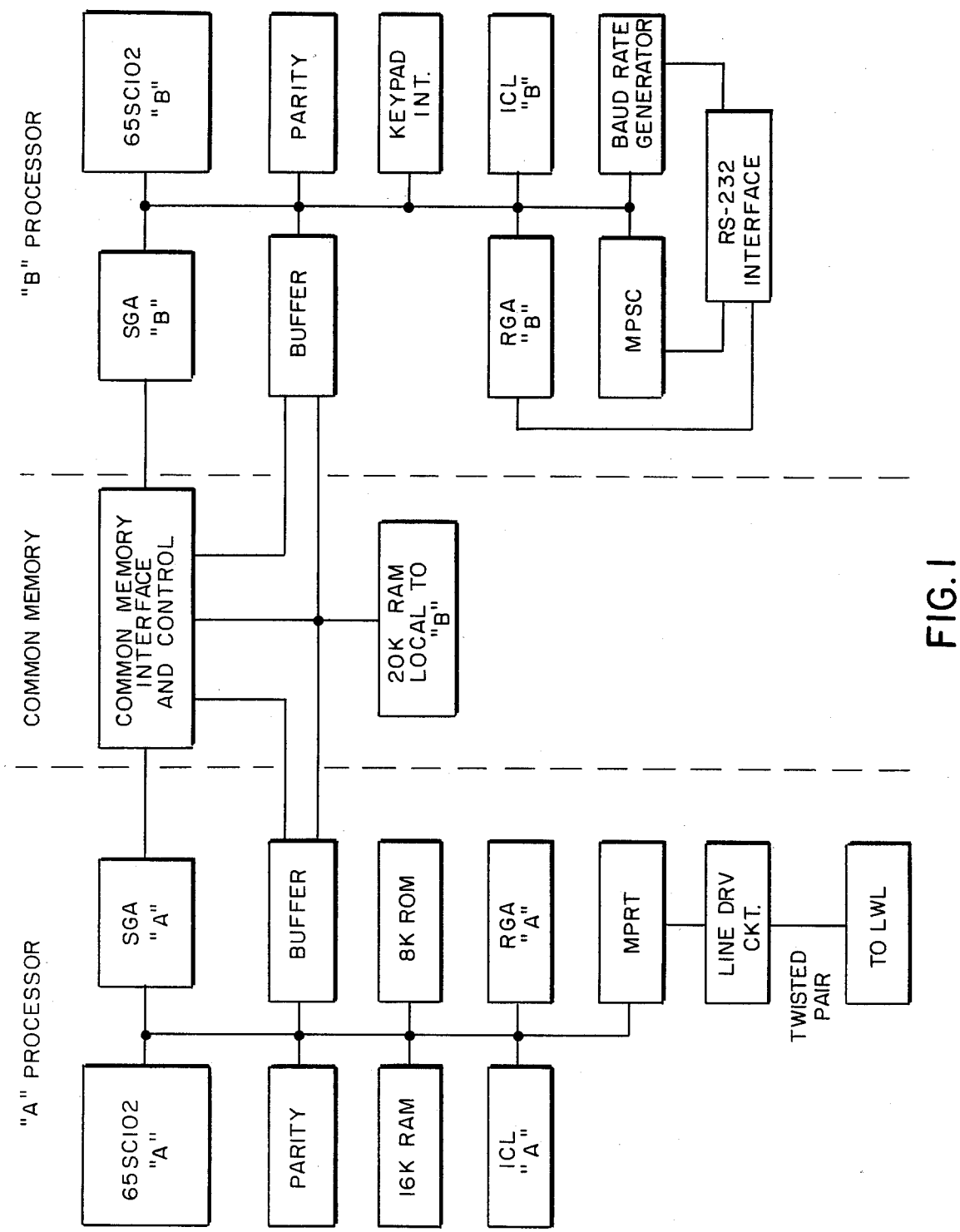
FIG. 1 is a block diagram of the synchronous packet manager of the present invention.
Figure 2:
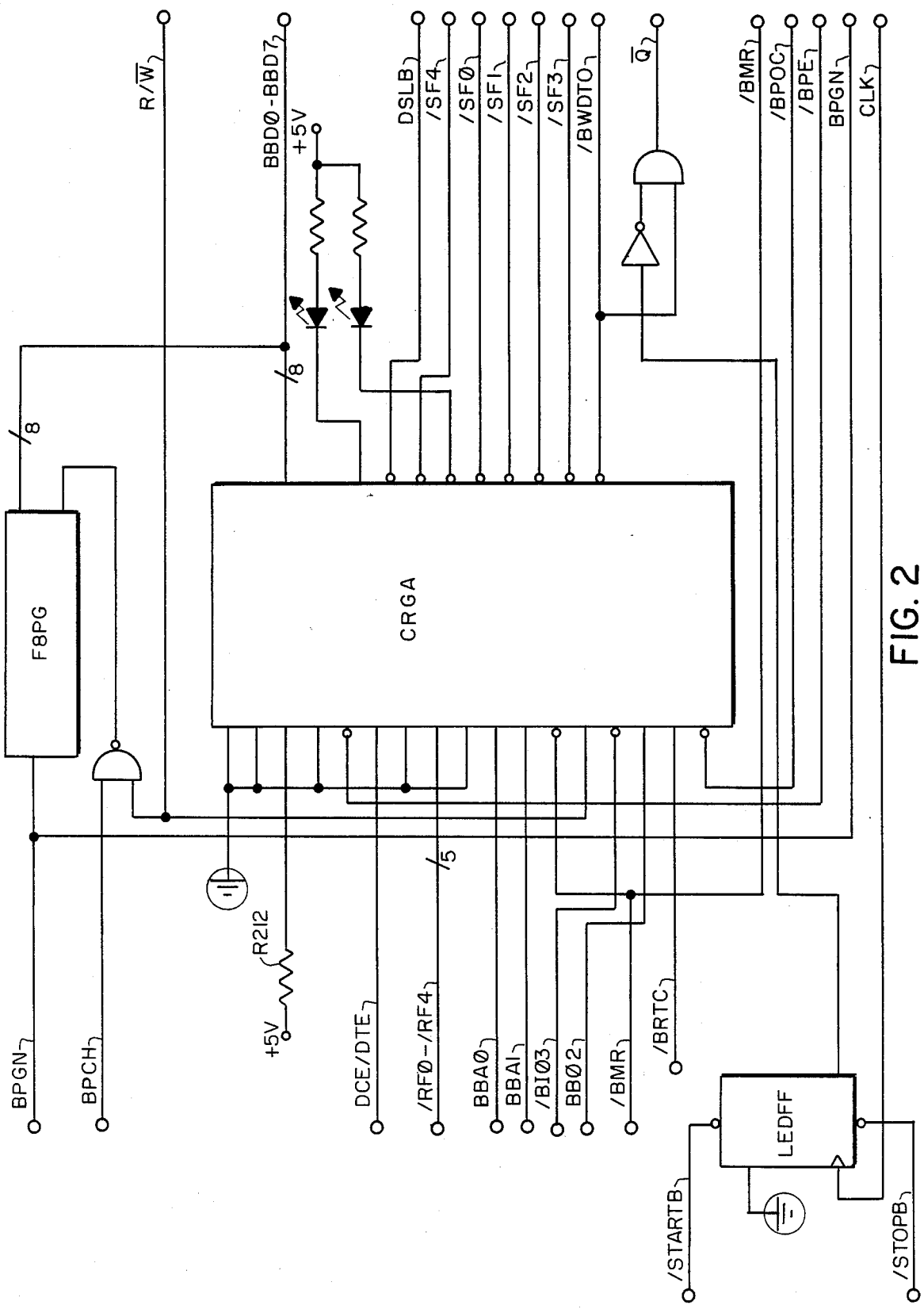
Figure 3:
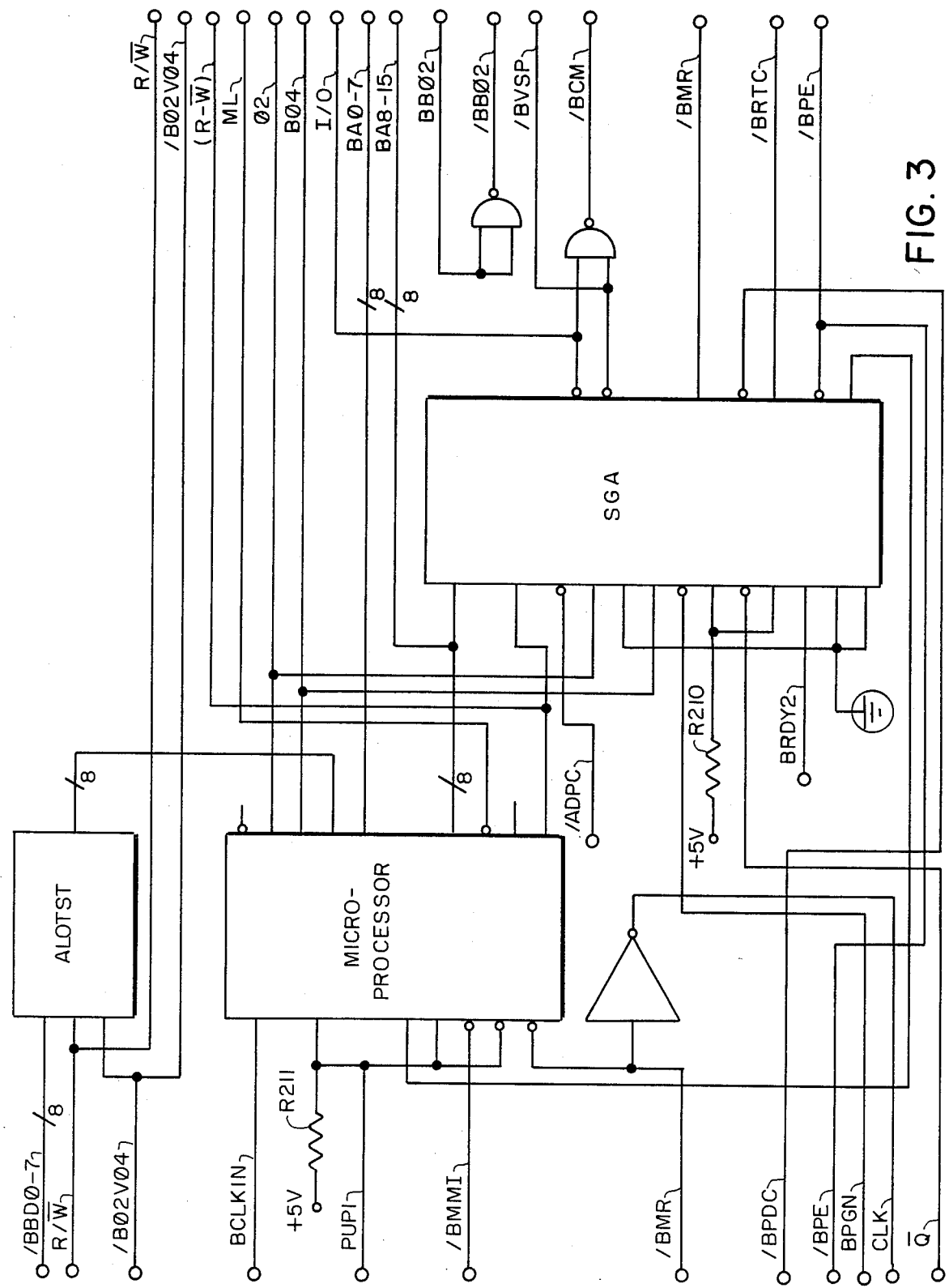
Figure 4:
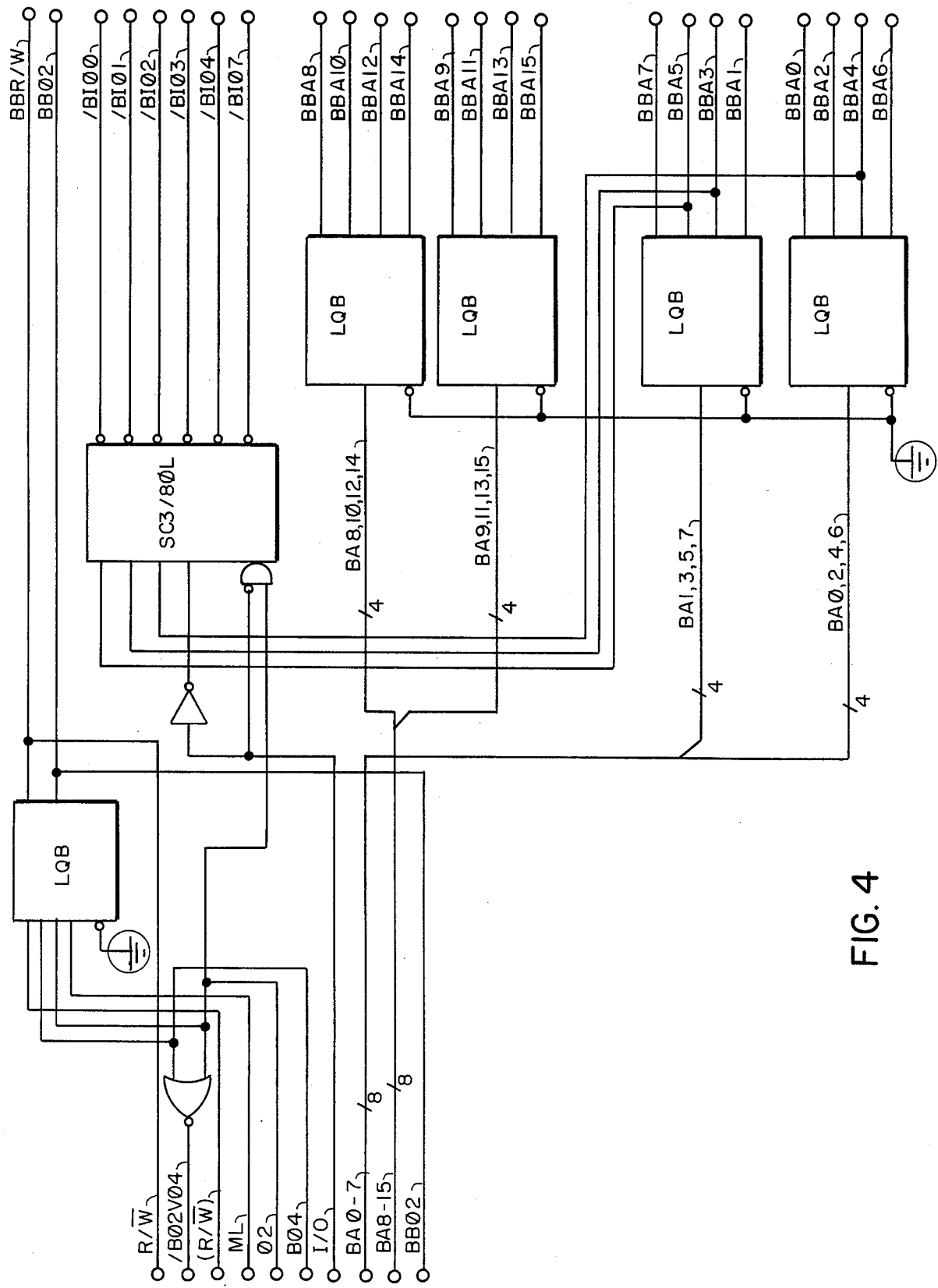
Figure 5:
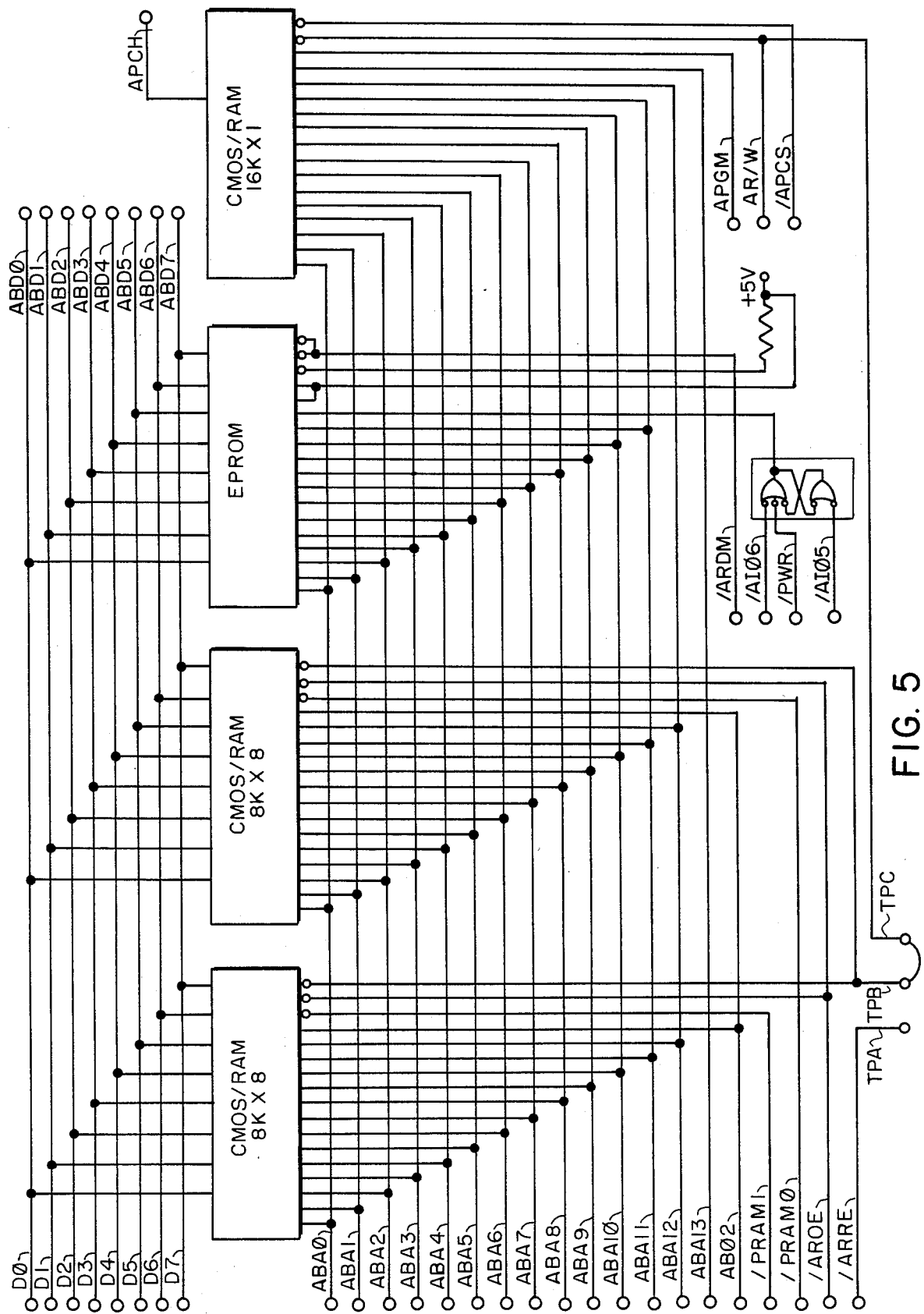
Figure 6:
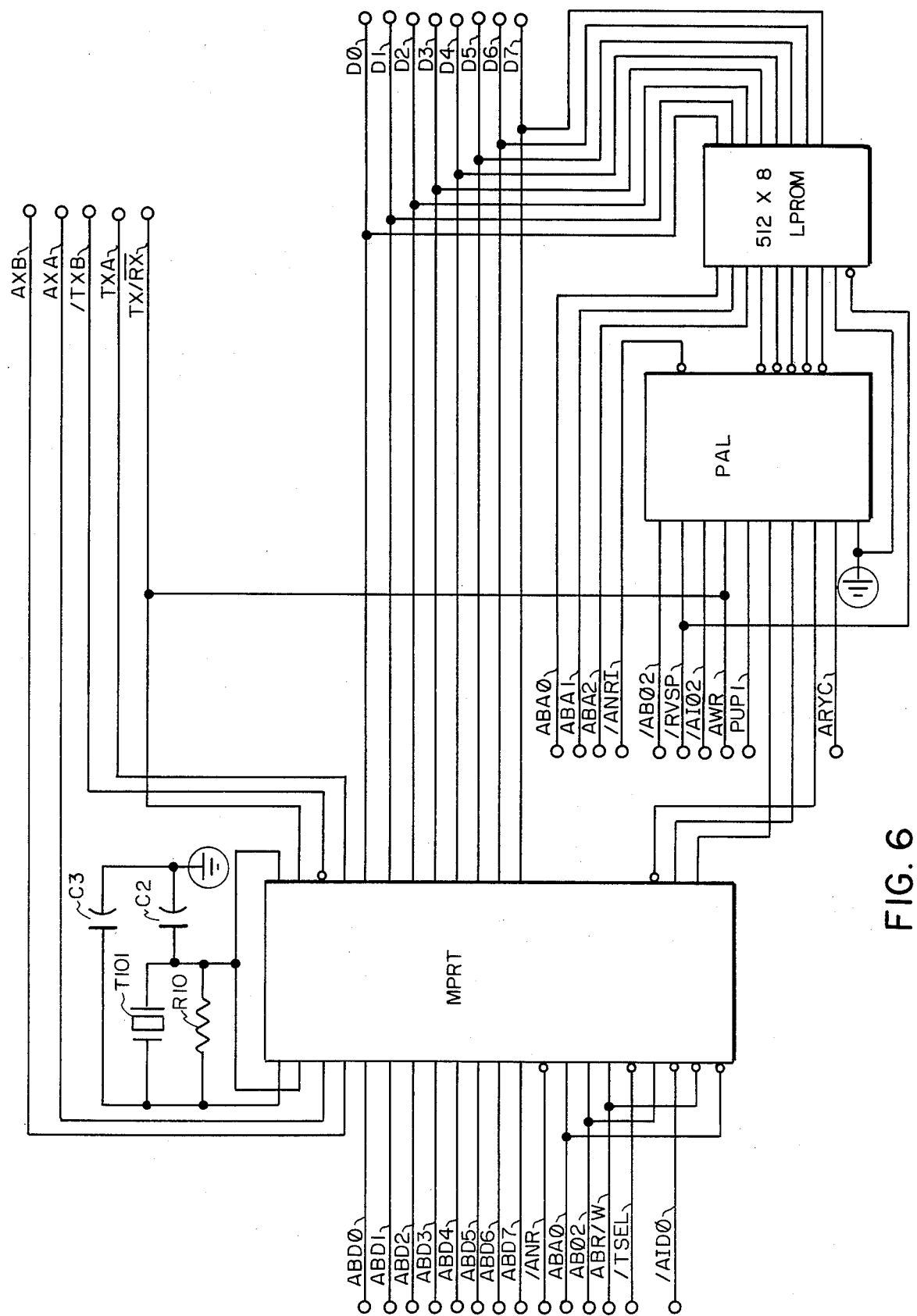
Figure 7:
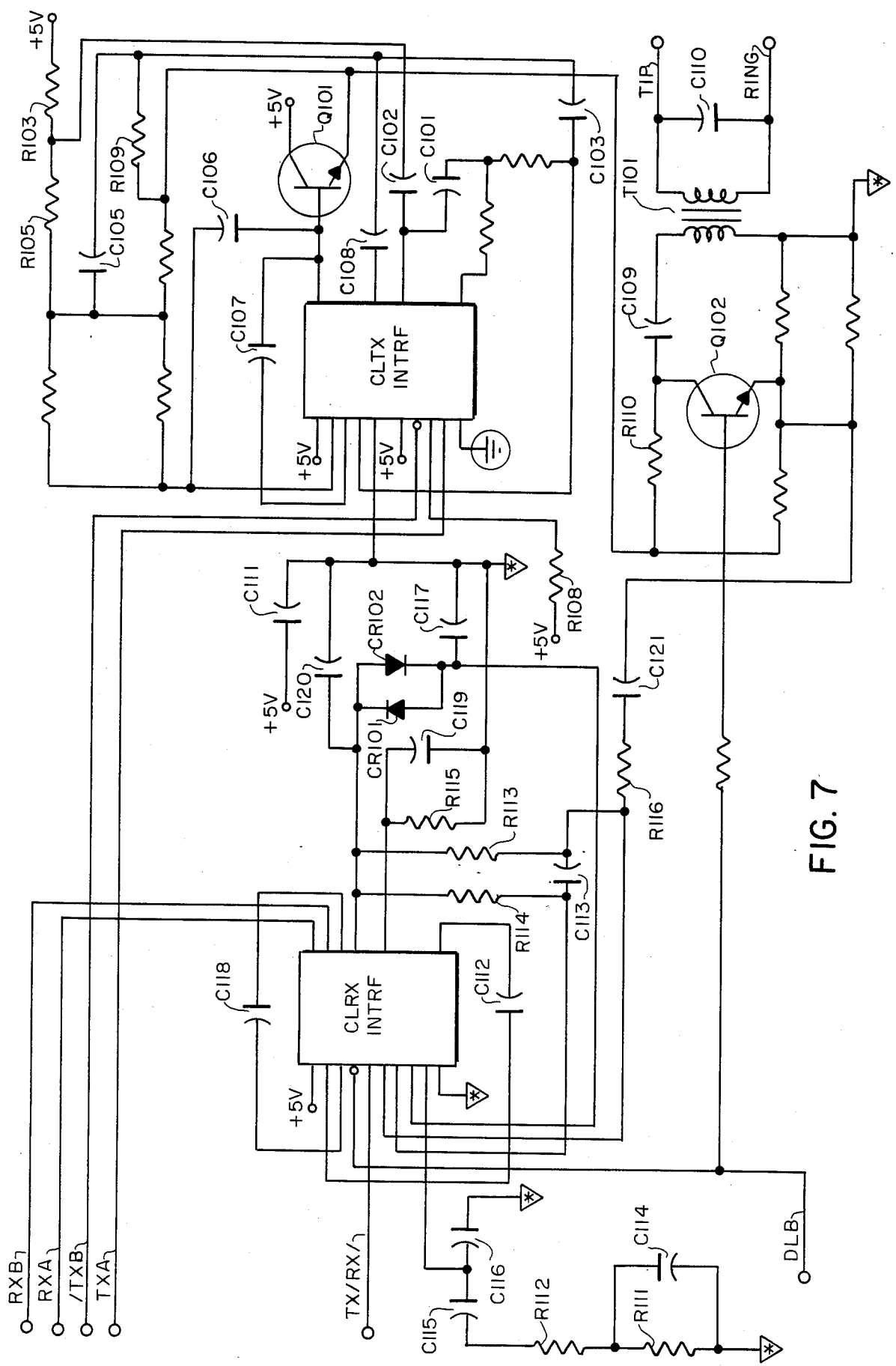
Figure 8:
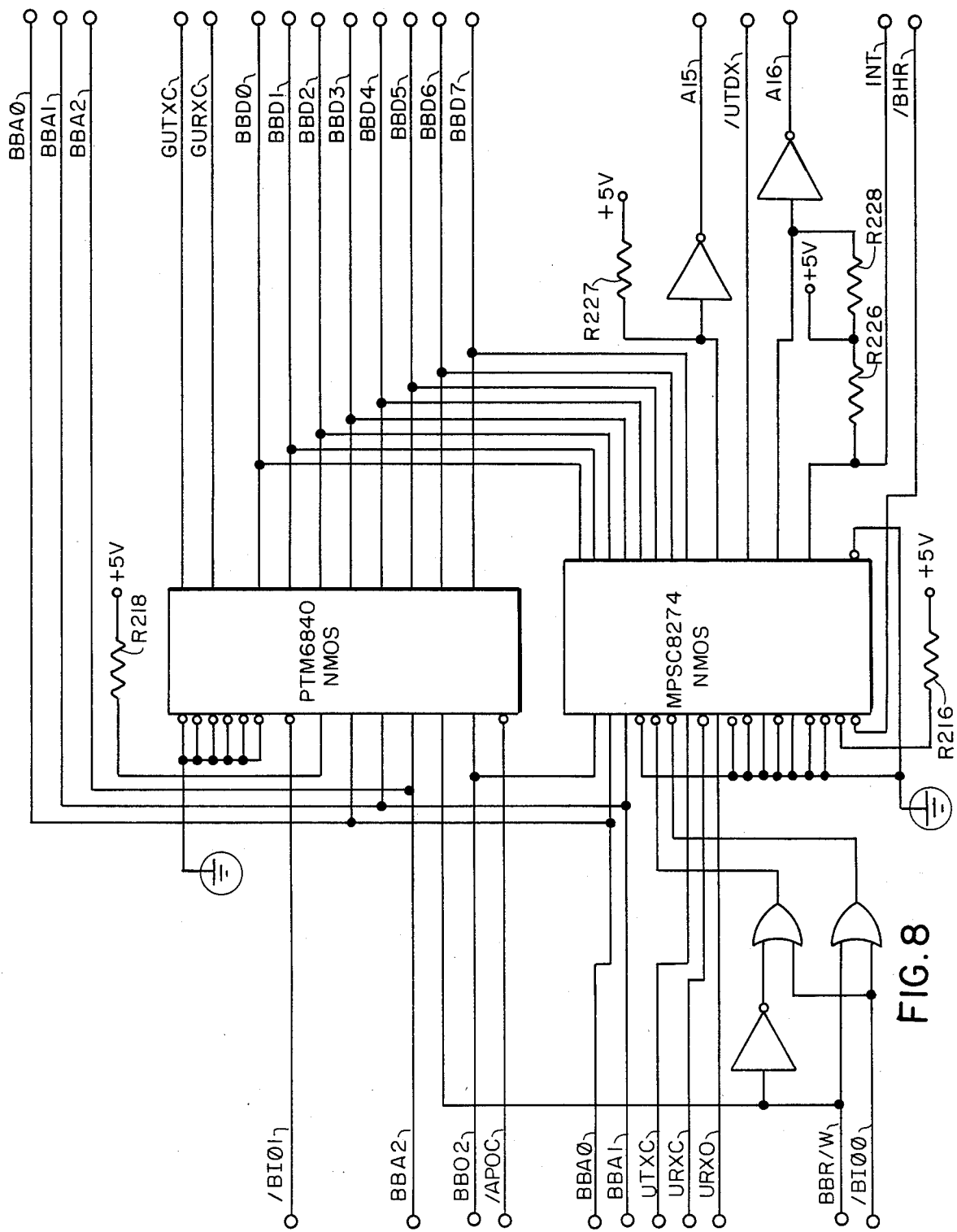

FIG. 1 depicts the (SPM) block diagram, functional description of each of the major components of modules that comprise the (SPA) hardware is described. 65SC102 Microprocessor. The SPM uses two 2 MHz 65SC102 microprocessors which are responsible for transferring data between the microprocessors memory and I/O devices. Data transfer is accomplished via the microprocessor's 8 bit bi-directional data bus under the control of the R/W, enable, and system clock signals. The 65SC102 is fabricated using GTE's ISO-CMOS process technology.

System Gate Array (SGA). The System Gate Arrays (SGA) are responsible for generating device selects through addresses decoding, providing microprocessor control signals such as Ready and Synchronized Clock, performing Reset functions upon detecting active input signals from Watch Dog Timer timeout, Reset Switch or Parity Error output, and provides a long reset on Power Up. The SGA contains no registers and remains transparent to software.

Register Gate Array (RGA). The Register Gate Array provides the system's command control and status signals associated with the serial I/O devices. These signals are implemented by Command/Status registers which contain Send and Receive functions, switch and LED status, Watch Dog Timer (WDT), Loop back control outputs, Watch Dog Timer timeout status, and microprocessor reset status.

Memory Module. Random Access Memory (RAM). The SPM provides 80K ROM, 16K of which is local to the "A" processor, 44K common to the "A" and "B" processor, and 20K only accessible by the "B" processor. The 44K and 20K blocks combine to form a 64K memory module. The 16K for the "A" processor consists of two 80K by 8 static RAMs which can be implemented by either Hitachi HM6264 LP-15 8K by 8 static RAMs or Intel C2186-25 8K by 8 integrated static RAMs. Local memory is parity protected by a 16K by 1 fast static RAM, Hitachi HM 6167 70 nS or equivalent. Common memory is implemented by eight 64K by 1 dynamic RAMs and is also parity protected.

Read Only Memory (ROM). The SPM provides 8K ROM which contains on board diagnostic programs and storage data implemented by two 4K banks, referred to as bank 0 (lower bank) and bank 1 (upper bank). Only one 4K bank can be selected and read at a time. This selection process is accomplished by accessing specific I/O locations which will enable either the upper 4K lower 4K of ROM.

On Power Up and Reset the upper bank is selected. The ROM is an 2764 EPROM.

Mini Packet Receiver/Transmitter (MPRT). The MPRT is an LSI device which provides the interface between the line driver/receiver circuit and two eight-bit parallel ports. The SPM uses one MPRT and it interfaces directly with the "A" microprocessor data bus.

Line Driver/Receiver Module. The Line Driver and Receiver circuit is the physical interface between the MPRT and OMNI switch. The circuit consists of the Line Receiver (714B) Line Driver (713B) and associated discrete components and an isolation transformer coupled loop circuitry. The major function is to provide bi-directional communication on a single twisted wire pair.

8274 Multi-Protocol Serial Controller (MPSC). The Intel 8274 Multi-protocol Serial Controller is a microcomputer peripheral device which supports Asynchronous (start/stop), Byte Synchronous (Monosyn, IBM Bisync), and Bit Synchronous (ISO's HDLC, IBM's SDLC) protocols. This controller's flexible architure allows easy implementation of variations of these three protocols with low software hardware overhead.

The MPSC provides two independent serial receiver/transmitter channels and can support several microprocessor interface options. Polled, Wait Interrupt driven and DMA driven. The MPSC is a 40 pin device, fabricated using Intel's High Performance HMOS technology.

The SPM utilizes the MPSC in the Bit Synchronous HDLC mode and Communicates on channel A only.

68B40 Programmable Timer Module (PTM). The 68B40 Programmable Timer Module is an integrated set of three distinct counter/timers. It consists of three 16 bit data latches, three 16-bit counters, and the comparison and enable circuitry necessary to implement various measurement and synthesis functions of the three independent timers on the PTM, the (SPM) utilizes two, one for the transmit clock and the other for the receive clock.

Interrupt Controller Logic (ICL). There are two ICL circuits on the SPM one for the "A" processor and the other for the "B". Each ICL controls five prioritized vectored interrupts and reset vectors and transmits the appropriate interrupt to the microprocessor via the NMI signal. Four of these interrupt inputs are level sensitive and one edge sensitive. All interrupts can be enable and disabled by accessing specific memory locations. Each ICL circuit consists of a PAL (16RBA-2) and a PROM (TBP28L42). The PAL contains the interrupt processing logic while the PROM stores the prioritized Interrupt, Break, and Reset vectors.

RS232C Drivers/Receivers. The RS232 Drivers and Receivers provide the physical interface between the SPM and the data equipment. They translate the synchronous data, transmit and receive signals, and the RGA send and receive functions to RS232C compatible and digital signals.

Keypad Module. The SPM assembly provides the hardware to support the addition of a 3 by 4 keypad matrix. This will allow a remote user to set-up a connection through the switch without using the RS232 port, in standard format.

LEDS and Switches. The SPM utilizes three LEDS and two switches which are implemented as follows:

The "X" .25 LINK LED (LED 2) indicates that the LINK Level of the X.25 interface is in the information Transfer State and that, in conjunction with MPP operation, virtual calls may be established at the Packet Level after completion of the Restart procedure.

The "SWITCH LINE" LED (LED 1) indicates when the Mini Packet Protocol line is operational and mini packets are being transmitted and received.

The "X.25 TEST ACTIVE" (LED 3) is extinguished during normal operation. When the TEST button is depressed and diagnostic software is being downloaded from the switch, the LED will be "ON".

DCE/DTE Switch indicates the SPM communication mode. When depressed, the unit is in the DTE mode and when released, it is the DCE mode.

RESET SWITCH causes an SLD Master reset when depressed.

Circuit Overview. The SPM unit consists of two 8-bit microprocessors (GTE Microcircuit 65SC102) operating at 2 MHz and has access to 8K of Read Only Memory (ROM) and 80K of Random Access Memory (RAM). The netlink or "A" processor controls the interface to the Local Wire Link (LWL) via the MPRT which performs all the Mini-Packet Protocol (MPP) processing and runs the Netlink protocols required for communiction with the OMNI S111/Data Switch. The "A" processor is the system's master and performs SLD initialization via the bootstrap ROM. In operation, the ROM executes board diagnostics and loads software into the Netlink processor's local memory and into Common Memory for execution by the Facilities or "B" processor.

The "B" processor performs the X.25 Protocol processing and interfaces with the Intel 8274 Multi-Protocol Serial Controller (MPSC) and the baud rate generator circuit which utilizes the 68B40 Programmable Timer Module (PTM). The MPSC 8274 device controls the physical I/O interface between the SLD and the DTE/DCE via the RS232C port. It sends and receives HDLC frames and automatically provides functions such as CRC detection, abort detection, zero bit insertion and CRC calculation.

The System Gate Array (SGA) is a processor interface device which performs address decoding, device selection, RESET control, parity logic, ready control, and clock synchronization between the two processors. The Register Gate Array (RGA) is a processor I/O device which provides registered output, latching input register and a processor status register which logs reset conditions; and Board Configuration. The Interrupt Control Logic sequences and controls processor interrupts.

NETLINK PROCESSOR. The Netlink or "A" processor runs the software necessary for the SLD to communication with the OMNI Data Switch over the Local Wire Link. The "A" processor is the system's master and is responsible for board initialization.

The Netlink processor architecture is shown on FIGS. 2-18 of the schematic. The "A" processor consists of an ICL for assisting with I/O handling, data signal buffers to ensure adequate driver capability and a decoder for device selection. In addition to the above components, it also has an SGA for address decoding, an RGA for I/O register storage and the MPRT for Mini-Packet Protocol communication.

65SC102 Microprocessor. The 65SC102 microprocessor has an 8-bit bidirectional data bus and a 16-bit address bus. The device uses a 4X clock which produces two system clocks PH12 and PH14 each operating a 2MHz. With PH14 delayed by 125 nanoseconds. These clocks run the "A" microprocessor peripheral devices.

Figure 11:
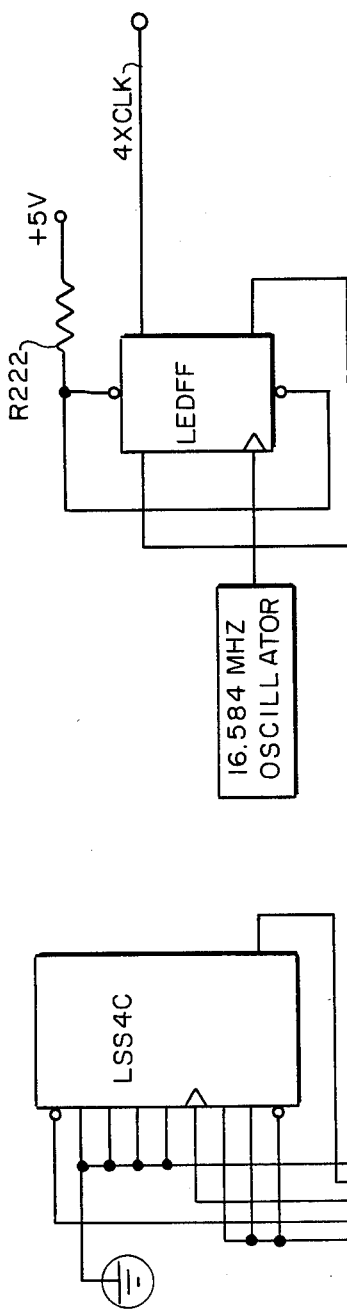
Figure 12:
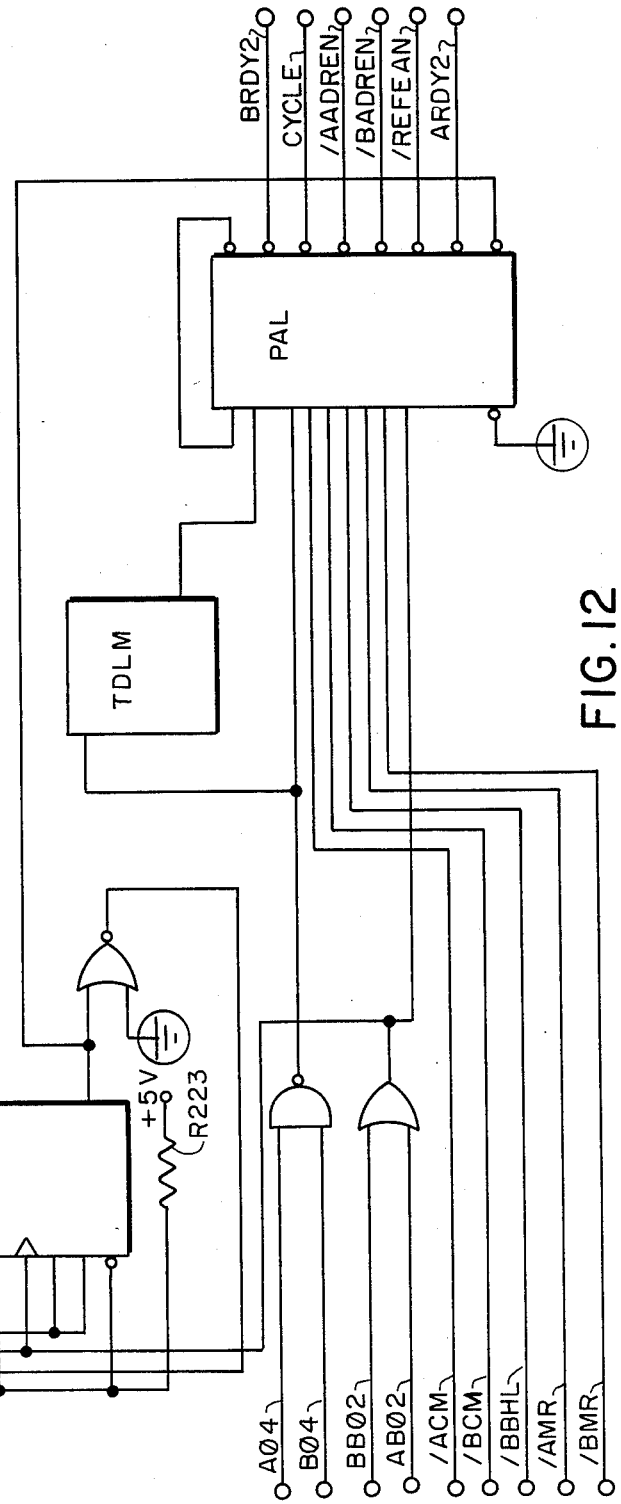
Figure 13:
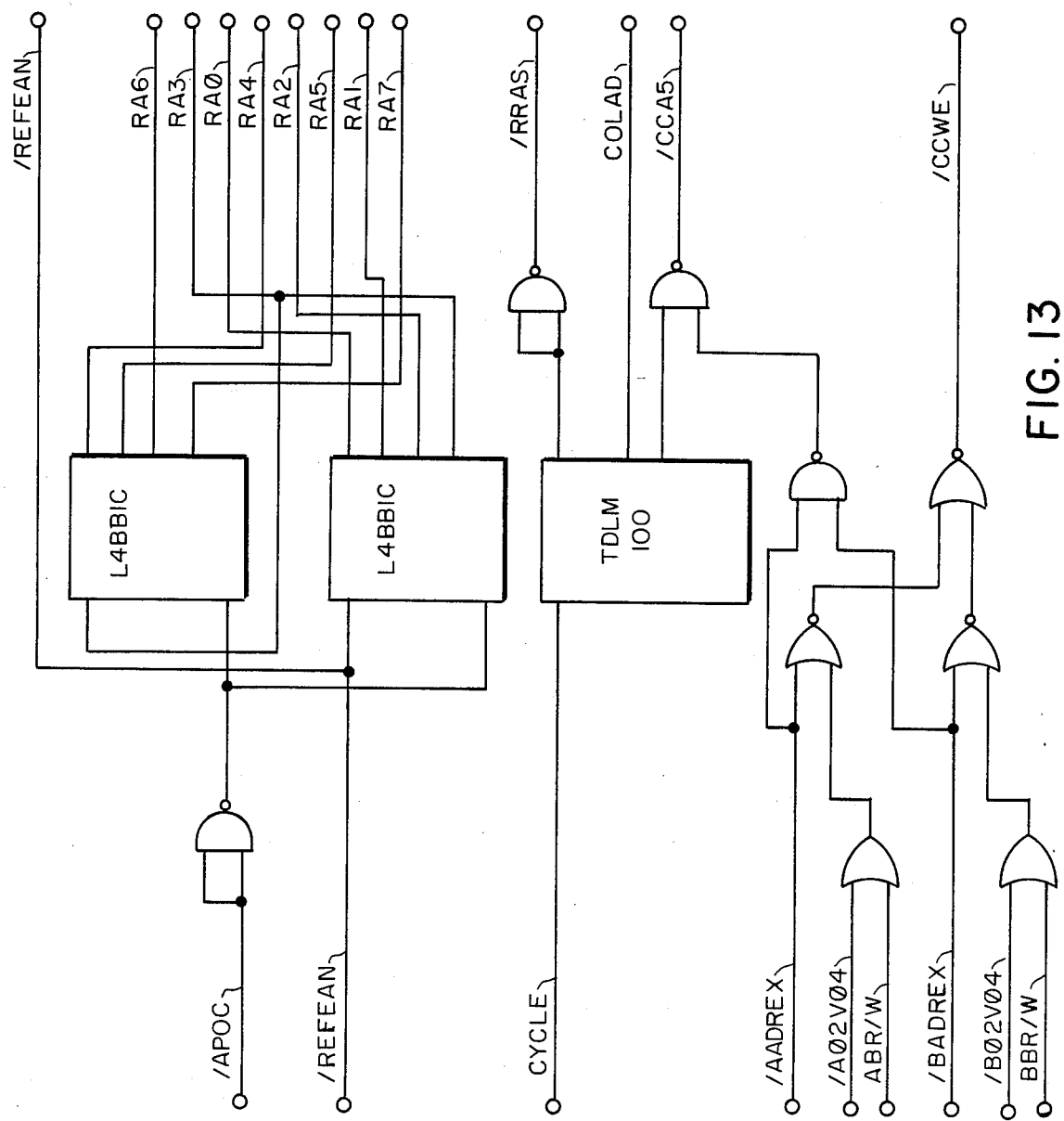
Figure 14:
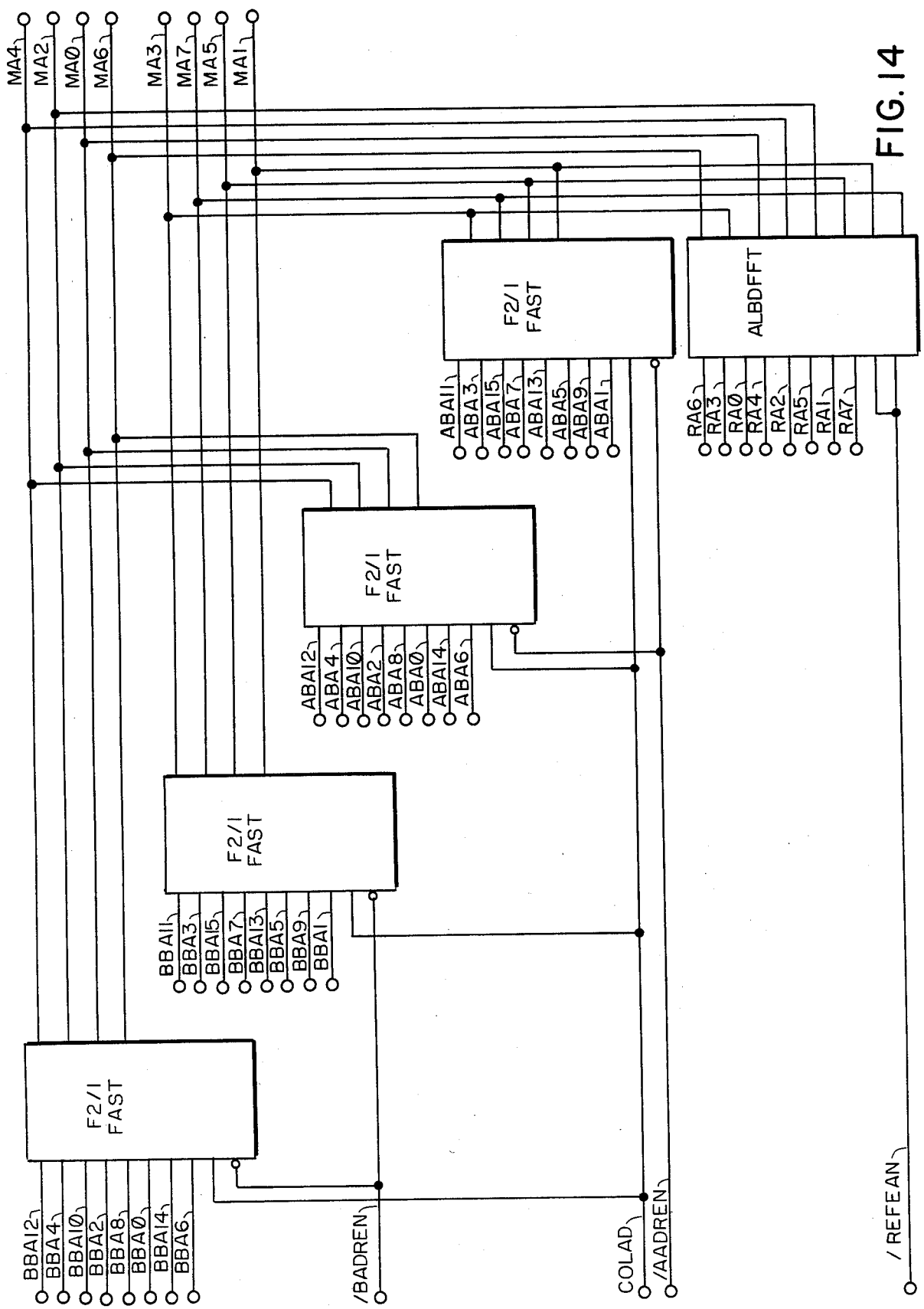
Figure 15:
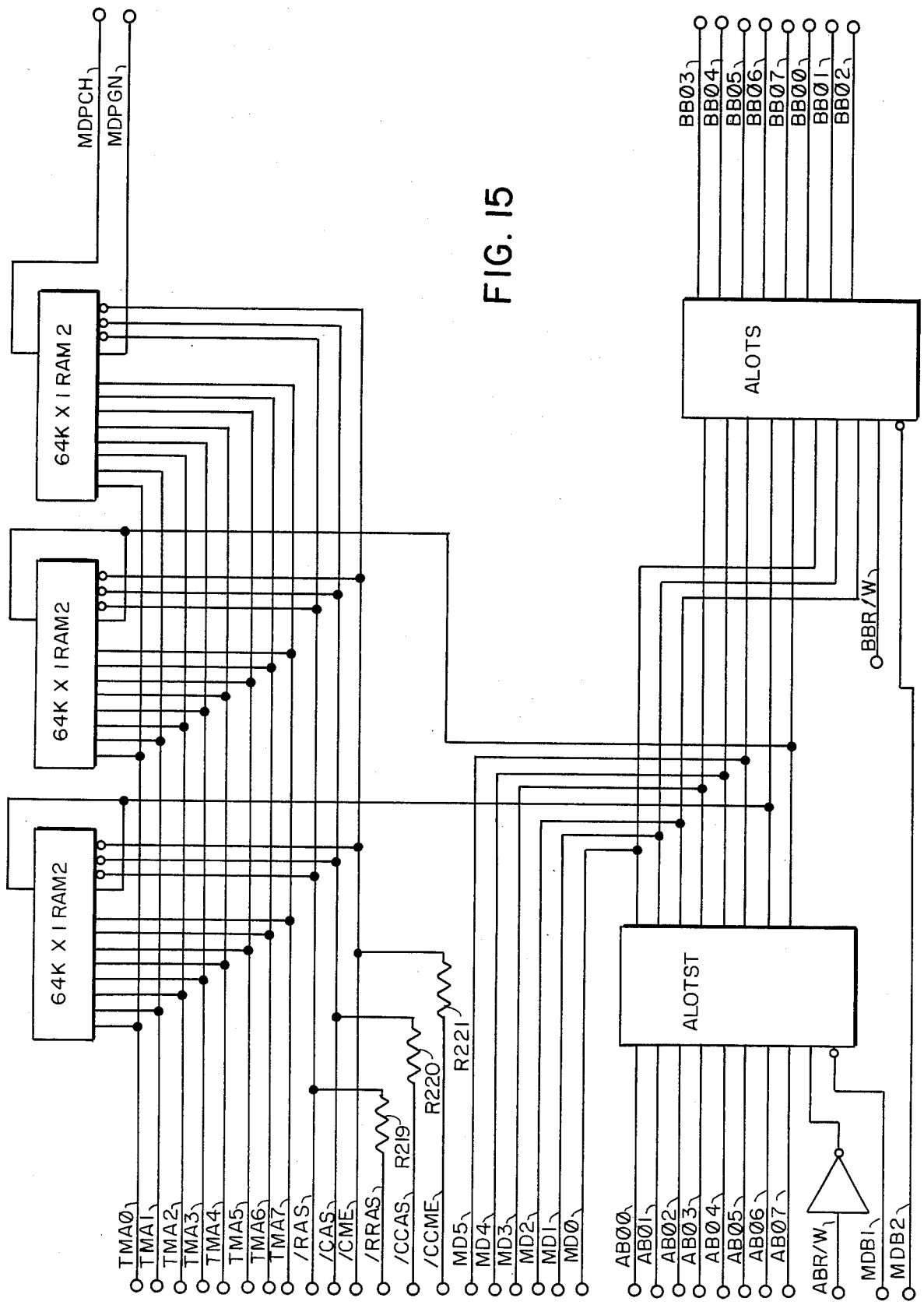
Figure 16:
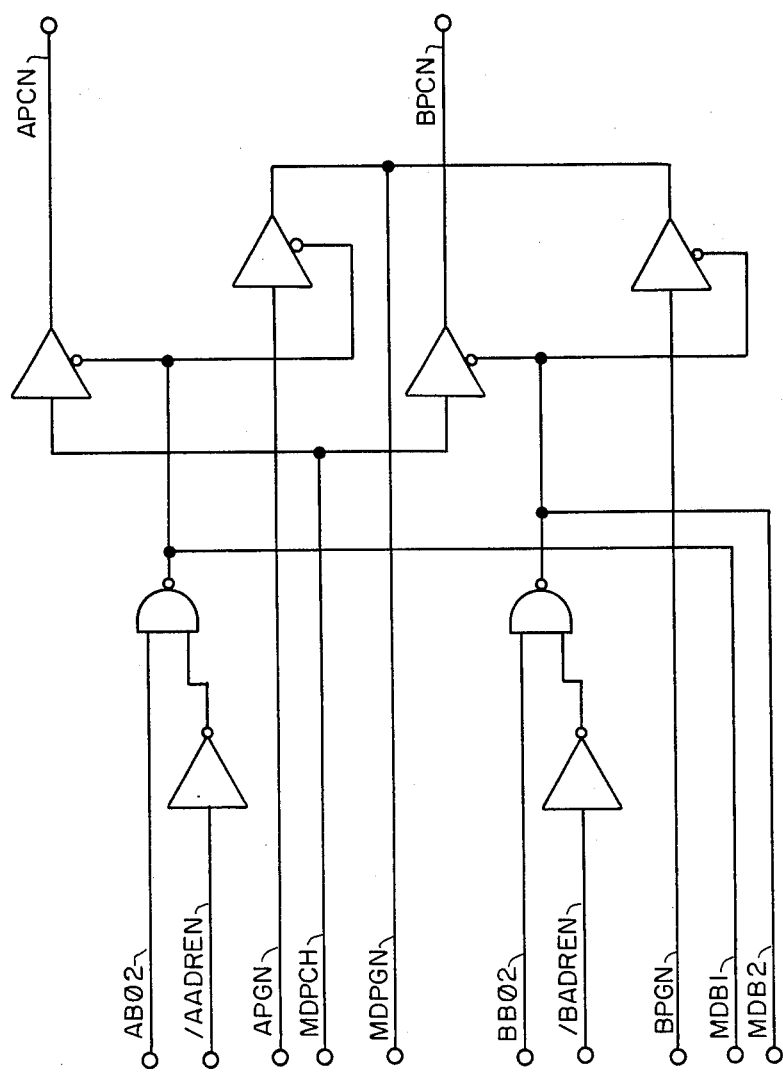
Figure 17:
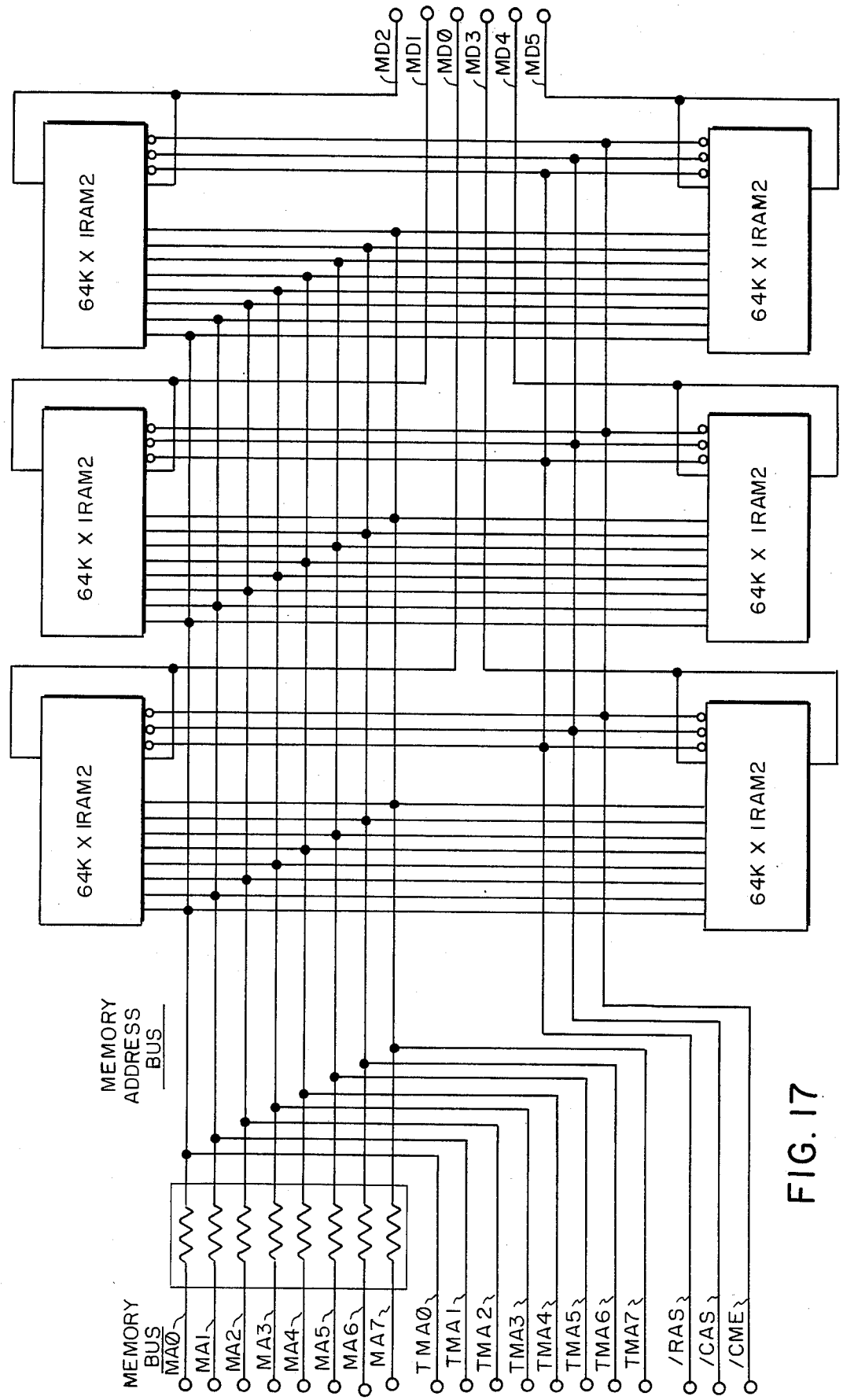
Figure 18:
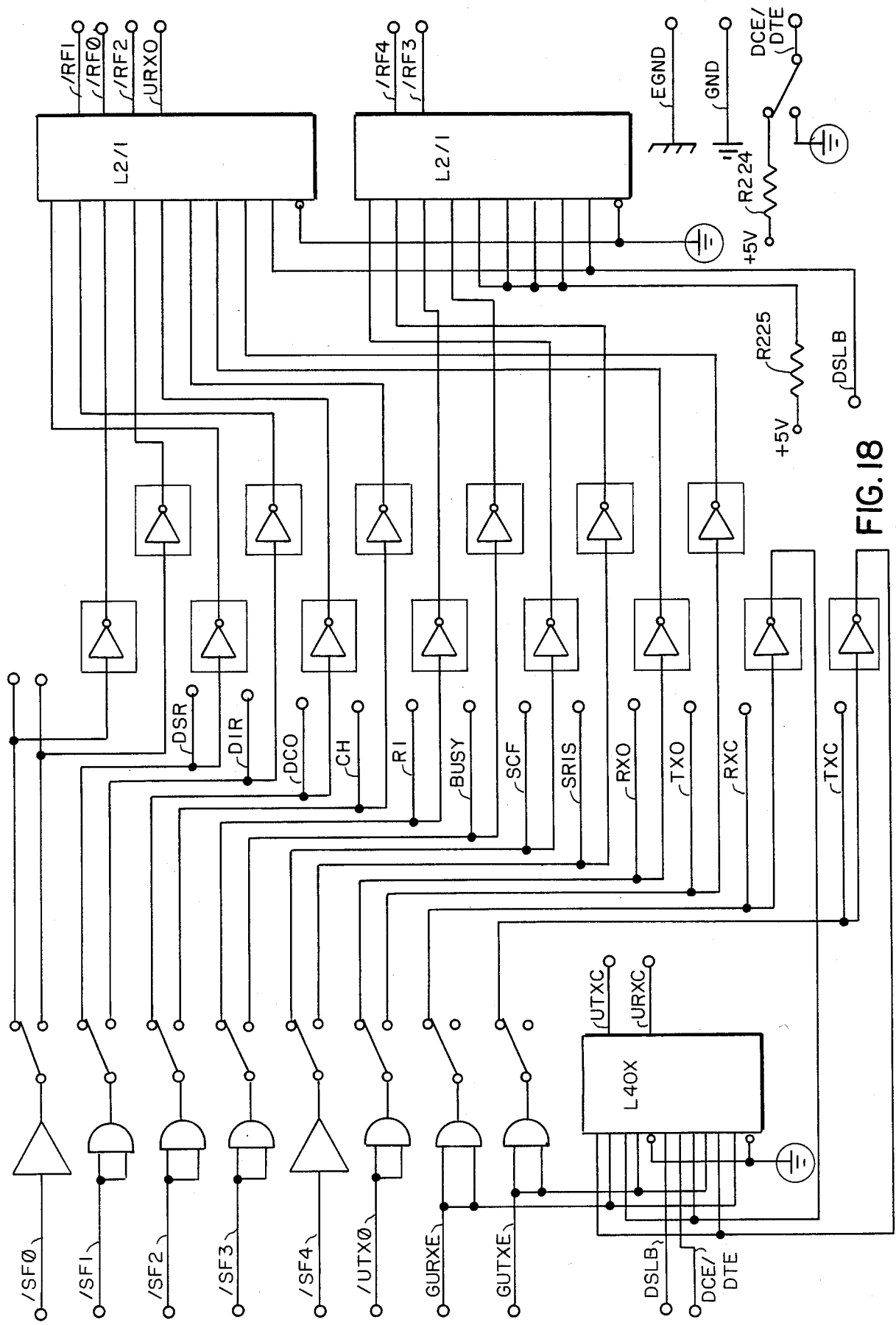
Figure 42:
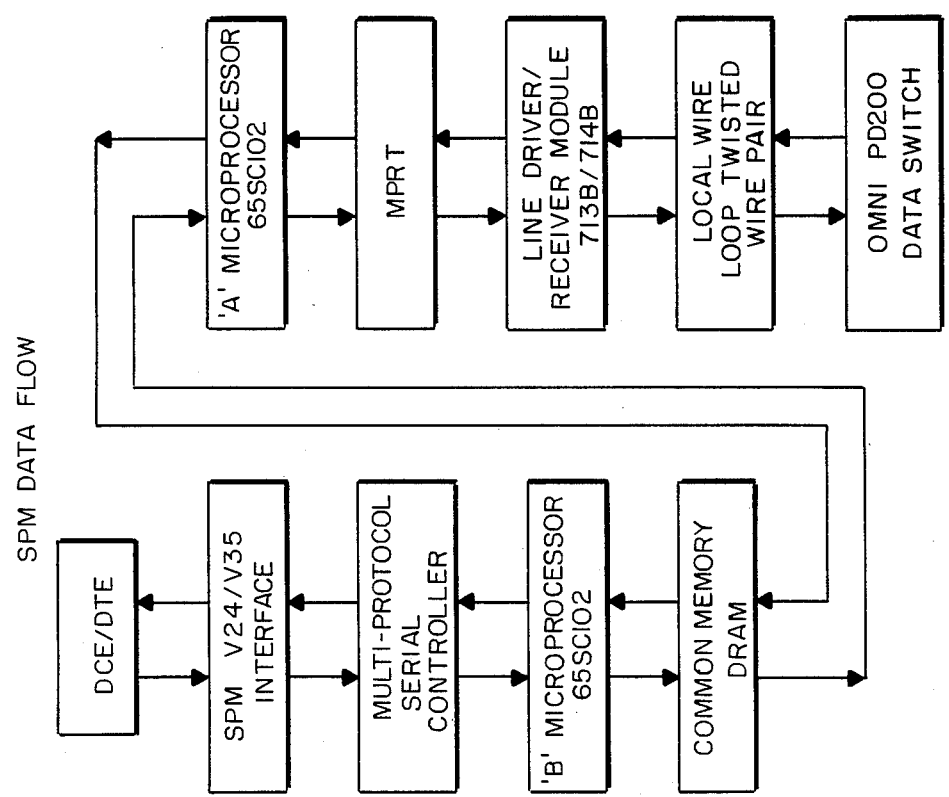
FIG. 42 shows the data flow through the synchronous packet manager.

The 4X clock FIG. 11 is generated by a 16.384 MHz oscillator connected to U75 and presented to, where it is synchronized to generated the clocks for the R/W signal, and to qualify the address (AO–A15) and data (DO–D7) buses.

The data bus is buffered with the bidirectional transceiver 74SC245 to prevent bus collisions after each clock cycle and to provide the drive characteristics required for the devices connected to the data bus. The address lines are buffered by 74LS244's along with the R/W and PH12 signals. This provides isolation for these signals and improves drive capability as they are connected to various devices on the board. The Reset and RDY signals are generated by the SGA accordingly to the events monitored by the SGA. The ONMI input signal is activated by the ICL whenever one of five prioritized interrupts occurs and causes the microprocessor's program counter to be loaded with the interrupt vector from locations FFFA (low byte) and FFFB (high byte), thereby transferring program control to the non-maskable interrupt routine. /SO, /IRG are connected inactive to a single 10K pull-up resistor while BE connected to the same resistor enables the address and data buses.

SYSTEM GATE ARRAY. The System Gate Array is used on the Netline processor as follows:

Address Decoder: Output device selects and control for two 8K parity protected RAMs' one 8K ROM, one common memory space, one I/O space, and one Vector Space.

Parity Logic: Detects bad parity via Parity Sum and External Parity Enable input. The Parity Logic also activates Parity Error output and signals the Reset Logic on a bad parity conditions.

Reset Logic: provides a short reset after detecting active input signals for Watch Dog Timer timeout, Switch 1, Parity Error condition, and a long reset after Power UP.

Clock Timer Synchronizer Provides a time base which generates the Real Time Clock output based on the PH12 input clock frequency, and generates and synchronizes two microprocessor system clocks.

Ready Controller: Processes two Ready request inputs and generates a combined Ready request output to be interfaced directly to the Netlink processor Ready input. The Ready Controller also extends the duration of specific device select and control signals.

Address Decoder. The SGA address decoder utilizes inputs R/W, AB-A15, Ph12 and Ph14, and outputs /MR and RDY to generate device selects and control signals /RWE, /ROE, /RAMO, /RAM1, /CM1, /ROMCS, /I/O, and /VSP. The following is a summary of each device select or control signal.

/RWE: The RAM Write Enable signal for RAM0 and RAM1 when E1 and E2 are strapped, thereby, accommodating Intel's 2186-25 devices. An Address of 0000 of 3FFF during the last ¼ of a PH12 cycle will activate this signal during a write cycle provided /MR is inactive.

/ROE: The RAM Output Enable signal for RAMO and RAM1. An address of 0000 to 3FFF during the last ½ of a PH12 cycle will activate this signal during a read cycle provided /MR is inactive.

/ARAMO: Device select for the first 8K of RAM. An address of 0000 to 1FFF during the last ¾ of a PH12 cycle will activate this signal provided /MR is inactive.

/ARAM1: Device select for the second 8K of RAM. An address of 2000 to 3FFF during the last ¾ of PH12 cycle will activate this signal provided /MR is inactive.

/CM1: Device select for the "A" processor's common Memory. An address of 4000 to EDFF during the last ¾ of a PH12 cycle will activate this signal.

/ROMCS: ROM chip select for 8K of ROM. An address of EEOO to EDFF during the last ¾ of a PH12 cycle will activate this signal a read cycle provided /MR is inactive.

/I/O: Device select for the 0 to 8 decoder 74SC137 which can access 256 bytes of I/O space. An address of FE00-FEFF during the last ¾ of a PH12 cycle will activate this signal provided /MR is inactive. /I/O is inverted by the 74CS04 to provide an address strobe for and latching addresses A3-A5 during the active I/O cycle. The six decoded select outputs are valid during the last ½ cycle when the second enable PH12 is high, and each interfaces directly to an individual I/O device.

/VSP: Vector Space select for the Interrupt Control Logic circuit. An address of FF00-FFFF during the last ¾ of a PH12 cycle will activate this signal provided MR is inactive. A total of 256 bytes of Vector Space can not be accessed.

Parity Logic. A parity error activates the/PE input for one cycle and is detected at PH12 falling edge when all of the following conditions are true: /SUM is inactive; AB-A15 address field has accessed 0000 -EDFF, R/W=1, and RDY is active. /SUM is an indication of parity determined by the 16K X 1 RAM, a 74LS00 device, and the 74F280. Parity is computed when a write cycle to RAMs forces the input signal on pin 4 HIGH, causing PI to reflect odd parity over D0–D7. PI is then stored in the parity bit for the particular location addressed. When the location is read, inverts the parity bit, and pin 5 reflects even parity. The data is then summed with this input (even parity previously computed) to yield a result at /SUM pin 35). /SUM will be LOW if parity is "good" and HIGH if parity is "bad" EPEN is the high-true External Parity Enable signal and is tied to /ROMCS so that parity checking is disabled when ROM is accessed by address field EEOO-EDFF.

Reset. Four events will cause the SGA to generate a/MR, /PUP, /WDT active, SW1 rising edge, and Parity Error detection. Two types of reset occur on the SLD, a Short Reset and a long Reset. The short reset occurs after a Reset Switch depression. WDT Timeout, or Parity Error detection and lasts 32 PH12 cycles (approximately 20 microseconds), while the Long Reset occurs after a Power Up condition which lasts 288 PH12 cycles (approximately 180 microseconds).

Long Reset. The Power up circuit is connected to the /PUP input on SGA. /PUP is active during power-up when the +5V-line is between OV and 2.8V. R204 and C1 generate a slow rise rise time of approximately five seconds, while CR1 quickly discharges C1 when the +5 V line drops below 3.5 V. The /PUP input hysteresis points are at 2.8 V (active) and 1.3 V (inactive). A Long Reset is initiated when /PUP is inactive and the input threshold voltage of 2.8 V is exceeded.

The SGA/POC output follows the /PUP input but is delayed by a minimum of one or a maximum of 2 clock cycles. When /PUP is inactive, /POC is also inactive at least one clock cycle after, as it is synchronized by PH12. /POC is used to generate a power up sequence on RGA, SGA on the Facilities or "B" processor, a Reset on the PTM on the "B" processor, and clear for the dual 4 bit counter on the "B" processor.

The /MR signal is also active when /POC is active and remains active for 288 clock cycles after /POC becomes inactive. During each power-up sequence just before /POC becomes inactive, /RAM0 and /RAM1 outputs become active for one cycle to ensure proper memory initialization.

Short Reset. As mentioned earlier, a Short Reset is caused by any of the following events: Parity Error detection, /WDT active or SW1 rising edge. A parity Error activates /PE for one cycle and is detected on the falling edge of Ph12 during a read access to 0000 - EDFF and when the following conditions are true. SUM=1,RDY=1 and EPEN=o. /SUM is an indication of a parity determined by the 16K by 1 RAM for local memory and the 64K by 1 and associated circuitry for Common Memory, both of which are connected to the 74F280 device. /SUM =o. when parity is "good" and 1 when parity is "bad". EPEN signal is connected to ROMCS so that parity checking is disabled when the RON is accessed in ROM space EE0O-EDFF.

The /WDT timeout is generated by RGA and presented to the SGA. It has a duration of one to two cycles, depending on when the timeout occurred relative to PH12. When the SGA recognizes a /WDT timeout on PH12 rising edge, it initiates a /MR on PH12 falling edge, and resets the RGA, causing /WDT to become inactive and causes the SGA to generate a Short Reset. /MR will remain active as long as /WDT is active.

The Reset Switch (SWI) on the SLD rear panel, when debounced will generate a Short Reset through the 74LS279 SR latch and resistors.

Clock Timer and Synchronizer. The SGA uses the 4X clock from the oscillator circuit, in conjunction with PH12, PH12B to generate CLKA for the "A" microprocessor and CLKB for the "B" microprocessor. The PH12 and PH14 clocks are used by the SGA as timing signals to generate device and control strobes for the Address Decoder, to provide a clock input for the Clock Timer and Synchronizer and to sample Ready request for the Ready Controller.

Ready Logic. The RDY1 input to the SGA is the high true wired - AND signal from RAMs which requests a wait set when inactive (low). The SGA latches the RDY1 signal and samples it on the PH12 rising edge. This conditioned RDY1 signal is logically ORed with the RDY2 input to generate the RDY output signal which is presented to the microprocessor's RDY input. The RDY2 signal is generated by PAL 16R4A.

Real Time Clock. The Real Time Clock (RTC) is produced by dividing the PH12 clock by 6144, generating an RTC of 300 Hz. It is the clock presented to the RGA for the Watch Dog Timer and the edge triggered interrupt input to the "A" processor's ICL circuitry. This interrupt has the last priority of the five interrupts associated with the "A" processor.

Register gate array. The RGA provides I/O signals to control and log system command and status events. Its three registers are controlled by the I/O space address locations and can be accessed specifically by addressing FED8-FEDA. It must be noted, that addresses FEDD-FEDF are not used and may cause unpredictable results, if addressed. The RGA is selected by the /A103 device select signal which is generated by the SGA and 74SC137.

The /CS, /MR, Ph12, R/W, A0 and A1 signals select the three RGA registers and enable them for read and write operation. Data transfers occur during PH12 active provided the RGA is selected and enabled.

Register 0. Address location FED8 selects register o which contains the status of the Netlink or "A" processor. If the Netlink processor is reset, the following bits will indicate the cause.

Bit 4—Reset due to Watch Dog Timer Timeout.
Bit5—Reset due to power on.
Bit 7—Reset due to a parity error in RAM.
Data bit 6 indicates the SLD mode configuration; DCE=1 and DTE=0.
Data bit 6 indicates the SLD mode configuration, DCE=1 and DTE=0.

The SLD strap configuration is given by bits 0-3 and is connected as 1001, H*9. Inputs CONFO and CONF3 are tied high via a 10K pull-up resistor, while CONF1 and CONF2 are connected to GND.

The Watch Dog Timer is started by writing a H* XA to location FED8. Once started, the WDT must be initialized every 32 Real Time Clocks or a WDT timeout will occur and will cause a processor reset. The RTC from the SGA has a frequency of 300 Hz, (period 3.333 msec) and divides by 32 to generate a WDT timeout period of 106.7 msec, approximately 1/10 second. If the WDT is activated and not sustained after 106.7 msec, /WDT will become active, and be presented to the SGA on the next PH12 rising edge and cause a reset which will render the RGA /WDT signal inactive.

Register 1. Address location FED9 selects Register 1. When the Reset Switch is depressed, bit 5 is set 1. Bit 3 controls LED1. To turn this LED on bit 3 is set to 1, and to turn it OFF bit 3 is set to 0. Bit 1 is the LPBR2 input which is connected to the /LDLB signal of the Line Receiver and allows the MPRT transmitted data to be looped back to the MPRT receive port. SW2 input is tied high via a 10K pull-up resistor and LED2 unconnected.

Register 2. Register 2 consists of four Send function, SF0-SF3 contained in bits 0-3 and four Receive Function, RF0-RF3, contained in bits 4-7. SF0 and SF1 are unconnected while RFO-RF3 are connected to the /BMR, /BWDTO, /B107 and /BPE, respectively.

Address location FEDA controls Register 2 and reports the status of the Facilities of "B" processor. A Facilities processor reset, will set bit 4, the B RESET bit. However, if the Facilities processor is reset by the WATCH Dog Timer it will set bit 5, the BWDTO bit. Likewise, if the Facilities processor is reset by a parity error, bit 7 the BPE bit will be set Bit 6, the ATTN from B bit is the /B107 I/O select from the Facilities processor. Bits 2 and 3 are the START B and STOP B bits for the Facilities processor. To stop the "B" processor, bit 3 of address FEDA is set to a 1. STOP B is overriding and must be set to a 0, while bit 2, the START B bit is set to a 1 in order to start the Facilities processor. During a Power Up sequence, the RGA resets bit 2 to a 0 and bit 3 to a 1 of address FEDA, thus ensuring that the "B" processor is unopernational. To start the Facilities processor bit 2 must be toggled from a 0 to 1 to 0, while bit 3 is st to 0.

MEMORY MODULE. The Netlink processor has 16K of local memory, 43 5K of Common Memory, both of which are parity protected, and 8K of ROM.

Local RAM. The 16K of static memory is implemented by two 8K by 8 static RAMs parity-protected by a 16K by 1 static RAM. Either Intel 2186-25 or Hitachi 6264-15 RAMs or equivalent can be used for U9 and U10. The parity RAM may be implemented by Hitachi 6167-B or equivalent.

Hitachi Option. A read cycle for the Hitachi 6264 static RAMs is initiated when inputs /CE, CE, /OE and PH12 are active. /CE is either /RAM0 for U9 or /RAM1 for U10 and is valid for the last ¾ cycle; /OE is active for the last ½ cycle. CE 2 is connected to Ph12 to enable the RAMs during the last ½ cycle.

A write cycle is accomplished by strapping E2 and E3. Write Enable, WE is then connected to AR/W directly from the microprocessor and is valid for the last ¾ cycle.

Common Memory. The Netlink or "A" processor can access 43 5K memory common to the Facilities or "B" processor. Memory is implemented by eight T1 4164 dynamic RAMs, parity protected and is "arbitrated" between refresh, the Netlink processor, and the Facilities processor. The Netlink processor has priority over the facilities processor except when the "B" processor is executing a memory lock instruction.

ROM. The Netlink processor 8K ROM is separated into two 4K banks, bank 0 and bank 1. The ROM is implemented by GTE 5365 8K by 8 and is used for running board diagnostics and for loading code into both processors. The 74SC137 device generates the two select outputs/AI05 and A106 which are switched by the 74LS279 device. The /AROM device select signal from the SGA is connected to /CE (pin 20) and /OE (pin 22), and is active during the last ¾ cycle. The output is tied to the address 12 (A12) input, pin 2 which is set high after a Reset, thus selecting bank 1. Bank 0 is selected when A12 input is low.

During a Power-Up sequence and Reset, bank 1 of the ROM is selected as it contains the board diagnostics and bootstrap routine. The configuration strap in RGA Register 0 allows the software to determine on which board it is running.

Mini Packet Receiver and Transmitter. The MPRT Non-Transparent and Transparent buses are interfaced to the Netlink microprocrssor data bus. The non-Transparent bus is used for data packets and the Transparent bus for voice packets. A 4.096 MHz crystal, a 1 M ohm bias resistor and two frequency stabilizing 12 pf capacitors and provide the MPRT oscillator and baud rate clocks.

Except for the select signals /NTSEL (pin 18) and /TSEL (pin 24), the Non-Transparent and Transparent register enables, selects, and data buses are connected in parallel and to the microprocessor interface signals R/W (pins 15 and 25), AO (pins 16 and 24), PH12 (pins 17 and 27) and /MR (pin 13). Four interrupts interface with the ICL. /TMPA (pin 22), /NTMPA (pin 20), /NTSA (pin 19) and/ERROR (pin 1). The signals TXA and TXB interface with the Line Driver and the RXA and RXB interface with the Line Receiver.

Line Driver/Receiver Module. The Line Driver device receives the MPRT TXA and TXB serial data signals to its +D1 and −D1 inputs and multiplexes these signals to produce a bipolar signal at pin 6. The bipolar signal is filtered out by a two state low pass filter and connects to an emitter transistor to provide a low output impedance to drive the loop through the isolation transformer and the resistor. The resistor, also provides the line termination impedance.

The Transistor and resistors provide the loopback function. For normal transmission to the loop the control signal /LDLB from the RGA is set high which turns on the transistor, and the Receiver receives the line signal through capacitor. For loopback operation, /LDLB is set low, turning off transistor causing the Line Receiver to now receive only the transmit signal of its own transmitter which is at the emitter of the transistor.

The Line Receiver receives the loop signal at pin 1 through capacitor, and resistor, and interfaces the received base baud data AT+D0 (pin 7) −D0 (pin 6) to the MPRT receive inputs RXA (pin 40) and RXB (pin 39). This Line Driver/Receiver circuit has both analog and digital ground pins which are connected together.

"A" Interrupt Controller Logic. The 16RBA PAL and PROM combine to form the ICL circuit which supervises all interrupt requests for the Netlink processor. The ICL accepts five interrupts, four level sensitive and one edge sensitive, and outputs the prioritized interrupt vector at /NMI which is directly connected to the Netlink processor /NMI input. The following is a list of the five interrupts in their prioritized order.

V1 0 NULL (Highest Priority)
V1 1 MPRT Mini Packet Available (NTMPA)
V1 2 MPRT Mini-Packet Transmit Space Available (NTSA)
V1 3 MPRT Error (ERROR)
V1 4 Real Time Clock (Lowest Priority)

All five interrupts are sampled at the end of a cycle when PH12 is rising. When interrupt is detected, /NMI is activated, causing the Netlink processor to fetch a vector via/VS from the SGA address decoder. The ICL latches all interrupts when /VS is active and presents them logically inverted to the PROM address bits A3–A7. PROM address bits A0–A2 are the system address bits A0–A2 which are used by the PROM to determine if the vector fetch is for a Reset Break or NM1. Address bit AB is tied low to enable the "A" bank of vectors. The PROM is enabled during the last ¾ cycle when /VS is active.

Facilities Processor. The Facilities or "B" processor runs the software that performs the X.25 Protocol processing. It interfaces with the Intel 8274 MPSC, the 68B40 PTM, as well as the I/O drivers and receivers which transmit and receive the RS232 compatible signals via the RS232 connector.

The Facilities processor consists of an SGA for address decoding and clock synchronization, an RGA for I/O register storage of the Receive and Send 68B40 PIM for baud rate generation. The Netlink processor starts and stops the Facilities Processor. The Facilities processor's 65SC102 is utilized similarly as the microprocessor on the "A" side. The only difference is that the /ML (pin 5) is used in the common memory control logic circuit. It must be noted that the Netlink processor cannot override the Facilities processor when it is performing an instruction which generates an active /ML during a Read-Modify-Write routine.

The isolation of the bidirectional data bus and the buffering of the output control and address lines. The "B" processor is started by the RGA which in turn is started by the Netlink processor. The microprocessor is stopped in a similar manner.

"B" System Gate Array. The SGA on the Facilities processor provides two address decoder signals, /I/O (pin 26) and /VSP (pin 27), parity control, ready control, reset control, and RTC. The power up input (pin 7) is activated by /APOC from the Netline processor and in turn produces the /BMR /BPODC required to reset the "B" processor components.

The device selects /I/O and /VSP are combined to form /BCM which is used to access Common Memory. The I/O signal is a device generates six decoded output signals. The /VS signal is the device select for vector space input for the "B" ICL.

"B" Register Gate Array. The "B" RGA is utilized similarly to the "A" RGa. The /CS, PH12, /PE, MR, R/W, CLK, A0 and A1 are connected to similar signals as were described on the "A" processor, except that these signals are generated by the "B" processor. The Rga is selected by the /B103 device select which is generated by the 74SC137. Its three registers can be accessed by addressing FED8-FEDA. Locations FEDB-FEDF are not used. Data transfers to the RGA is accomplished by the "B" processor during BPH12 active provided the device is selected and enable.

The four Send Function outputs, /SF0-/SF3 are latched outputs and interface directly to the 1488 line driver. However, after each Master Reset, /SF3 is initialized to the state of the DCE/DTE input from Switch, S4. Receive Function, /RFO-RF3 are the four input signals from the multiplexers. These inputs are derived from the 1489 line receivers which interface directly to the RS232 connector, P1. They represent the incoming RS232 compatible signals or the Send functions signals when is used in the loopback mode.

Register 0. Register 0 contains the configuration definition and status of the Facilities processor. If the "B" processor is reset the following bits will indicate the cause:

Bit 4—Reset due to B watch Dog Timer Timeout.
Bit 5—Reset due to Power On. (This is generated by the A side and connects to B side Via /APOC).
Bit 7—Reset due to a B side parity error.

The RGA register 0 is selected by addressing field FED8. Writing a H*XA at this location will start or reset the Watch Dog Timer depending on its previous state.

Register 1. Register 1 is selected by accessing address field FED9. Bit 0 indicates the status of the DSLB signal which is connected to LPBK1 (pin 1). The LPSK1 output is exclusive ORed with the /DCE/DTE input within the RGA and is used as the select input to the 74LS157 device. Bit 1 is set high during normal system operation, but is set low when the X.25 test active button is depressed and the diagnostic software have been down loaded from the switch. The LED connected to this output will be "ON".

Bit 2 controls the status of LED2 which when on, indicates that the LINK LEVEL of the X.25 INTERFACE IS in the information transferred state. Bits 3 and 4 represent the /SF4 (output LEDS) and /RF4 (INPUT SW2) signals. Bit 5, SW1 signal is tied low, while bit 5 and 6 are high.

Register 2. Register 2 is selected by FEDA. The four send function signals, /SF0-SF3 are latched in bits o-3 respectively, and the four Receive Function signals, /RFO-RF3 are latched in bits 4-7. With the ED/LEV (pin 22 )+0, the /RF signals are complemented and presented directly to the corresponding bit in register. All the /SF signals are latched, complemented outputs, but additionally, the /SF3 is initialized to the state of the DCE/DTE input.

In the DCE mode, /SF0, /SFL, /SF2, /SF3 AND /SF4 signals CTS, DSR, DCD, R1 and SCF, respectively while the RF0, /RF1, /RF2, /RF3, and /RF4 are RTS, DTR, Ch, BUSY and SRTS, respectively. In the DTE mode, the signals are switched, for example, /SF0 will be the RTS signal and /RFO, the CTS signal.

Memory Module. The Facilities processor utilizes 64K of the 80K of parity protected memory provided by the SPM. Of the 64 K, 43.5K is allocated to common memory which is accessible to both the "A" and "B" processors, while 20K is accessible to the "B" processor only. The 64K memory module is implemented by eight T1 4164-15, 64K X 1 Dynamic Rams or equivalent. The memory data bus is isolated by two transceivers, one for the A microprocessor data bus and the other for the "B" microprocessor. The transceivers are controlled by the /AR/W, /AB02, /AADREN and /B, R/W /BB02, and /BADREN. The /AADREN and /ABDREN signals are generated by the memory control logic circuit.

"B" Interrupt Controller Logic. The 16RBA PAL and PROM combine to form the ICL circuit which supervises all interrupt request for the Facilities processor. Following is the prioritized list for the five interrupts.

VI o: 8274 TXDRGA (highest priority)
VI 1: 8274 RXDRGA
VI 2: 8274 ERROR
VI 3: NULL
VI 4: Real Time Clock (lowest priority)

The B ICL circuit functions similarly to the A ICL.

MPSC. The 8274 Multi-Protocol Serial Controller is controlled by the Facilities processor. The device is always enabled as the /CS signal is tied low. However, data transfer from or to the "B" processor by the MPSC can only occur when its /WR (pin 212) /RD (pin 22) signals are activated. The /WR and /RD signals are generated by the microprocessor's /BBR/W SIGNAL COMBINED WITH the /BIOO device select. The A0 and A1 inputs determine which register and channel is selected for a Read/Write operation. Address field FECo selects channel A for a Read/Write operation and the FEC2 address selects channel A for a status read or command write. The A0 and A1 inputs are controlled by the corresponding address lines BBA0 and BBA1.

The MPSC is used in the BIT synchronous mode.

68B40 PTM. The Programmable Timer Module is selected by address field FECB-FECT. The RSo, RS1 and RS2 input signals in conjunction with the R/W input, select the internal registers, counters and latches. These signals correspond to the BBAO, BBA1, BBA2, and /BBR/W microprocessor signals. The /CS0 and /CS1 input signals select the PTM and effect data transfer from the device when /CS0 is low and CS1 is high.

The PTM is used to generate the transmit and receive baud rate clocks, GUTXC and GURXC. These clocks are multiplexed with the TXC and RXC signals by 74LS153 to produce the UTXC and URXC input clocks for the 8274 MPSC device. The UTXC signal clocks out data from the 8274 and the URXC signal clocks in data.

RS232 Drivers and Receivers. The Facilities processor controls the RS232 Drivers and Receivers, and multiplexer. The 1488 drivers convert the TT1 signals from the MPSC, PTM and RGA to RS232-C compatible signals. All output signals to the RS232-C interface pass through switch, S4 which is used to switch signals to accommodate both the data equipment DTE and DCE modes.

The incoming signals except for RXC and TXC, pass through the 1489 receivers and are multiplexed by the 74LS157 devices before returning to the RGA/RF inputs. The /DSLB signal which enables the multiplexers A or B input, is used to perform a loopback mode, whereby the /SF signals are returned back to the RGA as /RF signals. This facilitates SLD testing.

We claim:

1. In a telecommunication switching network for interconnecting data units arranged to transmit data in a first format to a switching unit arranged to switch data of a second format, an apparatus for synchronously converting said formats comprising;

a multi protocol serial controller (MPSC) module;
an interface operated to convert incoming data to TTL levels and connected to said MPSC:
said MPSC operated to convert received serial data onto a parallel data bus;
a memory means;
a first microprocessor connected to said parallel data bus and operated to place said data into said memory means;
a minipacket receiver transmitter;
a second microprocessor operated in response to the placement of the data into said memory means to forward said data to said minipacket receiver transmitter;
said minipacket receiver transmitter operated upon receipt of said data to format said data into minipackets and to convert said formatted data to an alternate mark inversion signal for connection to a switching network.

* * * * *